US012667967B2

(12) United States Patent
Jones et al.

(10) Patent No.: US 12,667,967 B2
(45) Date of Patent: Jun. 30, 2026

(54) MULTI-AXIS ROBOTIC VIAL LOADING SYSTEM

(71) Applicant: Manufacturing Compliance and Automation Services, Inc., Knightdale, NC (US)

(72) Inventors: Cameron Jones, Wendell, NC (US); Michael Nativi, Holly Springs, NC (US); Brandon Pitts, Nashville, NC (US); Eric Longo, Raleigh, NC (US)

(73) Assignee: Manufacturing Compliance and Automation Services, Inc., Knightdale, NC (US)

( * ) Notice: Subject to any disclaimer, the term of this patent is extended or adjusted under 35 U.S.C. 154(b) by 14 days.

(21) Appl. No.: 18/925,517

(22) Filed: Oct. 24, 2024

(65) Prior Publication Data

US 2025/0128416 A1     Apr. 24, 2025

Related U.S. Application Data

(60) Provisional application No. 63/545,420, filed on Oct. 24, 2023.

(51) Int. Cl.
| | |
|---|---|
| *B25J 9/16* | (2006.01) |
| *B25J 9/00* | (2006.01) |
| *B25J 15/00* | (2006.01) |
| *B25J 15/04* | (2006.01) |
| *B25J 15/06* | (2006.01) |

(52) U.S. Cl.
CPC ........... *B25J 9/1669* (2013.01); *B25J 9/0084* (2013.01); *B25J 9/0093* (2013.01); *B25J 15/0408* (2013.01); *B25J 15/0616* (2013.01)

(58) Field of Classification Search
CPC ...... B25J 9/1669; B25J 9/0084; B25J 9/0093; B25J 15/0408; B25J 15/0616; B25J 15/0052
See application file for complete search history.

(56) References Cited

U.S. PATENT DOCUMENTS

| | | | | |
|---|---|---|---|---|
| 5,879,277 | A | * 3/1999 | Dettman | .............. B25J 15/0491 901/41 |
| 7,181,314 | B2 | 2/2007 | Zhang | |
| 7,693,604 | B2 | 4/2010 | Gerat | |
| 7,783,383 | B2 | 8/2010 | Eliuk | |
| 7,890,292 | B2 | 2/2011 | Jacquot | |
| 8,187,535 | B2 | 5/2012 | Londo | |
| 9,533,416 | B2 | 1/2017 | Garde | |
| 9,821,462 | B2 | 11/2017 | Garde | |
| 10,586,418 | B2 | 3/2020 | Greyshock | |
| 10,786,897 | B2 | 9/2020 | Raak | |
| 10,921,336 | B2 | * 2/2021 | Hansen | .................. G01N 35/10 |
| 10,926,418 | B2 | 2/2021 | Lu | |
| 11,065,759 | B2 | 7/2021 | Gold | |
| 11,351,679 | B2 | 6/2022 | Riedel | |
| 11,440,191 | B2 | 9/2022 | Bordegnoni | |

(Continued)

*Primary Examiner* — Harry Y Oh
(74) *Attorney, Agent, or Firm* — NK Patent Law

(57) ABSTRACT

A multi-axis robotic vial loading system designed for transporting containers. The multi-axis robotic loading system includes a conveyor belt for transporting vials to a multi-axis robotic arm. The multi-axis robotic arm includes a gripper configured to attach to one or more vials. The multi-axis robotic arm moves the vials from the conveyor belt to a storage container.

20 Claims, 49 Drawing Sheets

(56)     References Cited

U.S. PATENT DOCUMENTS

| | | | | |
|---|---|---|---|---|
| 11,660,159 | B2 | 5/2023 | Keibel | |
| 2006/0259195 | A1* | 11/2006 | Eliuk | .................. B01F 33/8442 |
| | | | | 700/245 |
| 2008/0069730 | A1* | 3/2008 | Itoh | ...................... G01N 35/026 |
| | | | | 422/65 |
| 2021/0299855 | A1 | 9/2021 | Hashimoto | |
| 2022/0144567 | A1* | 5/2022 | Schubert | ................ B65H 3/325 |
| 2022/0314440 | A1* | 10/2022 | Mizoguchi | ............. B25J 9/1692 |
| 2022/0371833 | A1* | 11/2022 | Ikemoto | ............... B65G 47/905 |
| 2022/0379419 | A1 | 12/2022 | Vuadens | |
| 2023/0042999 | A1 | 2/2023 | Koyama | |
| 2023/0120642 | A1* | 4/2023 | Le | ............................ B65C 9/46 |
| | | | | 156/64 |
| 2023/0152036 | A1 | 5/2023 | Merz | |
| 2023/0158716 | A1 | 5/2023 | Nishimuta | |
| 2023/0176084 | A1 | 6/2023 | Silbert | |
| 2025/0256403 | A1* | 8/2025 | Fine | ....................... B25J 9/1692 |

* cited by examiner

100

116

112

118

120

102

104

108

106

114

110

122

400

410

404

408

406

402

414

412

504     502

604

602

704    702

804

802

902

904

902

904

1402

1404

1502

1502

BLOCK DIAGRAM
2500

BLOCK DIAGRAM
2600

BLOCK DIAGRAM
2700

BLOCK DIAGRAM
2800

MULTI-AXIS ROBOTIC VIAL LOADING SYSTEM

CROSS-REFERENCE TO RELATED APPLICATION

This application claims the benefit and priority to U.S. Provisional Patent Application No. 63/545,420, filed on Oct. 24, 2023, the entire contents of which is incorporated by reference herein in its entirety.

BACKGROUND

Manual loading and unloading processes have poor ergonomics resulting in poor posture and strain on operators due to repetitive motions. Additionally, manual processes result in inconsistencies with vial orientation and vial count due to human error that can negatively affect downstream processes such as sterilization or tray unloading. Another problem with manual processes includes efficiency losses (e.g., underfilled trays) or overestimation of vial count.

Automatic loading and unloading systems increase productivity and product protection during manufacturing applications such as vial transportation. However, there are systematic issues with filling volumes, missing stoppers, contamination, and adapting to containers (e.g., vials) of varying sizes.

Therefore, there is a need for an automatic loading and unloading system that addresses the aforementioned problems.

FIELD OF THE INVENTION

The present invention is generally directed to robotic vial loading systems, more specifically, to robotic vial loading systems including multi-axis robotic arms.

BRIEF SUMMARY OF THE INVENTION

In some embodiments, the present invention includes a multi-axis robotic vial loading system comprising a conveyor belt, a multi-axis robotic arm including a vial gripper, a tray station, and a control panel.

In some embodiments, a multi-axis robotic vial loading system comprising a conveyor belt, a first multi-axis robotic arm including a vial gripper, a second multi-axis robotic arm including a vial gripper, a first tray station, a second tray station, and a control panel is disclosed. The conveyor belt transports at least one vial to the first multi-axis robotic arm and/or the second multi-axis robotic arm. The first multi-axis robotic arm and/or the second multi-axis robotic arm are designed to grab at least one vial via a corresponding gripper. The first multi-axis robotic arm and/or the second multi-axis robotic arm are further designed to transport at least one vial to the first tray station and/or the second tray station.

In some embodiments, the present invention includes a multi-axis robotic vial loading system comprising a conveyor belt including a first belt and a second belt, a first multi-axis robotic arm including a vial gripper, a second multi-axis robotic arm including a vial gripper, a first tray station, a second tray station, and a control panel. The conveyor belt transports a plurality of vials to the first multi-axis robotic arm and/or the second multi-axis robotic arm. The first belt of the conveyor belt moves a first plurality of vials to the first multi-axis robotic arm. The second belt of the conveyor belt moves a second plurality of vials to the second multi-axis robotic arm.

In some embodiments, a multi-axis robotic loading system is disclosed. The multi-axis robotic loading system includes at least one conveyor belt, at least one multi-axis robotic arm, and at least one gripper. The at least one conveyor belt is operable to transport at least one container to the at least one multi-axis robotic arm. The at least one gripper is removably attached to the at least one multi-axis robotic arm. Via the at least one gripper, the at least one multi-axis robotic arm is operable to grab the at least one container. Once the at least one gripper captures the at least one container, the at least one multi-axis robotic arm is operable to transport the at least one container to a storage device.

In some embodiments, the at least one multi-axis robotic arm has at least three degrees of freedom. In some embodiments, the storage device includes a tray and the at least one container includes a vial. In some embodiments, the at least one gripper includes a vacuum gripper. The vacuum gripper includes an attachment module, a vacuum generation component, and a gripping component. The attachment module is removably attached to the multi-axis robotic arm. In some embodiments, the at least one conveyor belt includes at least one container sorting component. The at least one container sorting component is operable to rotate a plurality of containers moving along the at least one conveyor belt. The at least one container sorting component is further operable to maintain spacing of the plurality of containers. In some embodiments, the at least one multi-axis robotic arm is operable to automatically change at least one gripper. The at least one multi-axis robotic arm changes the at least one gripper based on a container characteristic. The container characteristic includes at least one of container size or container shape. In some embodiments, the at least one gripper is operable to move in a horizontal direction and a vertical direction. In some embodiments, the multi-axis robotic loading system further comprises a plurality of grippers positioned above the at least one multi-axis robotic arm. The at least one multi-axis robotic arm is operable to extend toward the plurality of grippers. The at least one multi-axis robotic arm is operable to attached to at least one gripper of the plurality of grippers.

In some embodiments, a multi-axis robotic loading system is disclosed. The multi-axis robotic loading system includes at least one conveyor belt, a plurality of multi-axis robotic arms, and a plurality of grippers. The at least one conveyor belt is operable to transport a plurality of containers to the plurality of multi-axis robotic arms. The plurality of grippers is removably attached to the plurality of multi-axis robotic arms. Utilizing the plurality of grippers, the plurality of multi-axis robotic arms is operable to capture the plurality of containers. Once the plurality of containers is captured, the plurality of multi-axis robotic arms is operable to transport the plurality of containers to at least one storage device.

In some embodiments, the at least one conveyor belt includes at least two conveyor belts. The at least two conveyor belts includes a first conveyor belt and a second conveyor belt. The first conveyor belt transports a first plurality of containers to a first multi-axis robotic arm. The second conveyor belt transports a second plurality of containers to a second multi-axis robotic arm. In some embodiments, the first conveyor belt moves at a different speed than the second conveyor belt. In some embodiments, each multi-axis robotic arm of the plurality of multi-axis robotic arms includes at least three degrees of freedom.

In some embodiments, each multi-axis robotic arm of the plurality of multi-axis robotic arms includes at least five degrees of freedom. In some embodiments, the plurality of grippers includes at least one vacuum gripper. The at least one vacuum gripper includes an attachment module, a vacuum generation component, and a gripping component. In some embodiments, the plurality of grippers includes a pneumatic gripper. The pneumatic gripper includes an attachment module, a vacuum generation component, and a gripping component.

In some embodiments, each multi-axis robotic arm of the plurality of multi-axis robotic arms is operable to automatically change at least one gripper. In some embodiments, each multi-axis robotic arm of the plurality of multi-axis robotic arms is operable to change the at least one gripper based on a container characteristic. The container characteristic includes at least one of container size or container shape. In some embodiments, the at least one gripper is operable to move in a horizontal direction and a vertical direction. In some embodiments, the multi-axis robotic loading system further includes a plurality of grippers positioned above the plurality of multi-axis robotic arms. Each multi-axis robotic arm of the plurality of multi-axis robotic arms is operable to extend toward the plurality of grippers. Each multi-axis robotic arm of the plurality of multi-axis robotic arms is further operable to attach to at least one gripper of the plurality of grippers. Each multi-axis robotic arm of the plurality of multi-axis robotic arms is operable to place a connected gripper in the plurality of grippers. After placing the connected gripper in the plurality of grippers, the multi-axis robotic arm is operable to attach to a second gripper.

The present invention minimizes vial to vial contact, reduces vial damage by limiting stress during tray loading, improves vial packaging efficiency, reduces operator strain, and increases transport and bulk processing efficiency.

BRIEF DESCRIPTION OF THE DRAWINGS

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1A:
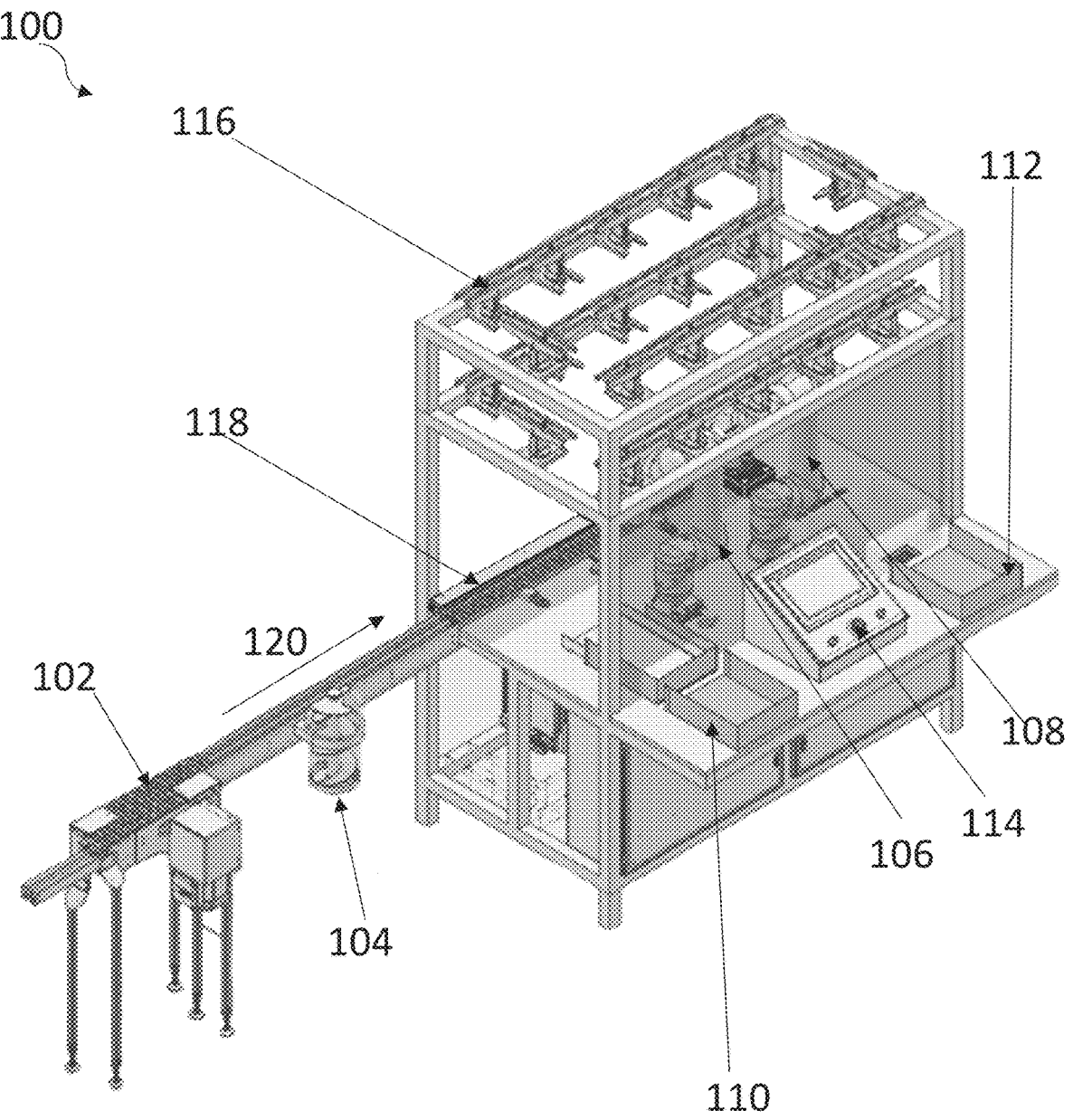
FIG. 1A shows a front perspective view of a multi-axis robotic vial loading system according to one embodiment of the present invention.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments+/−20%, in some embodiments+/−10%, in some embodiments+/−5%, in some embodiments+/−1%, in some embodiments+/−0.5%, and in some embodiments+/−0.1%, from the specified amount, as such variations are appropriate in the presently disclosed subject matter.

In some embodiments, a multi-axis robotic vial loading system comprising a conveyor belt, a first multi-axis robotic arm including a vial gripper, a second multi-axis robotic arm including a vial gripper, a first tray station, a second tray station, and a control panel is disclosed. The conveyor belt transports at least one vial to the first multi-axis robotic arm and/or the second multi-axis robotic arm. The first multi-axis robotic arm and/or the second multi-axis robotic arm are designed to grab at least one vial via a corresponding gripper. The first multi-axis robotic arm and/or the second multi-axis robotic arm are further designed to transport at least one vial to the first tray station and/or the second tray station.

In some embodiments, the present invention includes a multi-axis robotic vial loading system comprising a conveyor belt including a first belt and a second belt, a first multi-axis robotic arm including a vial gripper, a second multi-axis robotic arm including a vial gripper, a first tray station, a second tray station, and a control panel. The conveyor belt transports a plurality of vials to the first multi-axis robotic arm and/or the second multi-axis robotic arm. The first belt of the conveyor belt moves a first plurality of vials to the first multi-axis robotic arm. The second belt of the conveyor belt moves a second plurality of vials to the second multi-axis robotic arm.

In some embodiments, a multi-axis robotic loading system is disclosed. The multi-axis robotic loading system includes at least one conveyor belt, at least one multi-axis robotic arm, and at least one gripper. The at least one conveyor belt is operable to transport at least one container to the at least one multi-axis robotic arm. The at least one gripper is removably attached to the at least one multi-axis robotic arm. Via the at least one gripper, the at least one multi-axis robotic arm is operable to grab the at least one container. Once the at least one gripper captures the at least one container, the at least one multi-axis robotic arm is operable to transport the at least one container to a storage device.

In some embodiments, the at least one multi-axis robotic arm has at least three degrees of freedom. In some embodiments, the storage device includes a tray and the at least one container includes a vial. In some embodiments, the at least one gripper includes a vacuum gripper. The vacuum gripper includes an attachment module, a vacuum generation component, and a gripping component. The attachment module is removably attached to the multi-axis robotic arm. In some embodiments, the at least one conveyor belt includes at least one container sorting component. The at least one container sorting component is operable to rotate a plurality of containers moving along the at least one conveyor belt. The at least one container sorting component is further operable to maintain spacing of the plurality of containers. In some embodiments, the at least one multi-axis robotic arm is operable to automatically change at least one gripper. The at least one multi-axis robotic arm changes the at least one gripper based on a container characteristic. The container characteristic includes at least one of container size or container shape. In some embodiments, the at least one gripper is operable to move in a horizontal direction and a vertical direction. In some embodiments, the multi-axis robotic loading system further comprises a plurality of grippers positioned above the at least one multi-axis robotic arm. The at least one multi-axis robotic arm is operable to extend toward the plurality of grippers. The at least one multi-axis robotic arm is operable to attached to at least one gripper of the plurality of grippers.

In some embodiments, a multi-axis robotic loading system is disclosed. The multi-axis robotic loading system includes at least one conveyor belt, a plurality of multi-axis robotic arms, and a plurality of grippers. The at least one conveyor belt is operable to transport a plurality of containers to the plurality of multi-axis robotic arms. The plurality of grippers is removably attached to the plurality of multi-axis robotic arms. Utilizing the plurality of grippers, the plurality of multi-axis robotic arms is operable to capture the plurality of containers. Once the plurality of containers is captured, the plurality of multi-axis robotic arms is operable to transport the plurality of containers to at least one storage device.

In some embodiments, the at least one conveyor belt includes at least two conveyor belts. The at least two conveyor belts includes a first conveyor belt and a second conveyor belt. The first conveyor belt transports a first plurality of containers to a first multi-axis robotic arm. The second conveyor belt transports a second plurality of containers to a second multi-axis robotic arm. In some embodiments, the first conveyor belt moves at a different speed than the second conveyor belt. In some embodiments, each multi-axis robotic arm of the plurality of multi-axis robotic arms includes at least three degrees of freedom.

In some embodiments, each multi-axis robotic arm of the plurality of multi-axis robotic arms includes at least five degrees of freedom. In some embodiments, the plurality of grippers includes at least one vacuum gripper. The at least one vacuum gripper includes an attachment module, a vacuum generation component, and a gripping component. In some embodiments, the plurality of grippers includes a pneumatic gripper. The pneumatic gripper includes an attachment module, a vacuum generation component, and a gripping component.

In some embodiments, each multi-axis robotic arm of the plurality of multi-axis robotic arms is operable to automatically change at least one gripper. In some embodiments, each multi-axis robotic arm of the plurality of multi-axis robotic arms is operable to change the at least one gripper based on a container characteristic. The container characteristic includes at least one of container size or container shape. In some embodiments, the at least one gripper is operable to move in a horizontal direction and a vertical direction. In some embodiments, the multi-axis robotic loading system further includes a plurality of grippers positioned above the plurality of multi-axis robotic arms. Each multi-axis robotic arm of the plurality of multi-axis robotic arms is operable to extend toward the plurality of grippers. Each multi-axis robotic arm of the plurality of multi-axis robotic arms is further operable to attach to at least one gripper of the plurality of grippers. Each multi-axis robotic arm of the plurality of multi-axis robotic arms is operable to place a connected gripper in the plurality of grippers. After placing the connected gripper in the plurality of grippers, the multi-axis robotic arm is operable to attach to a second gripper.

Figure 1B:
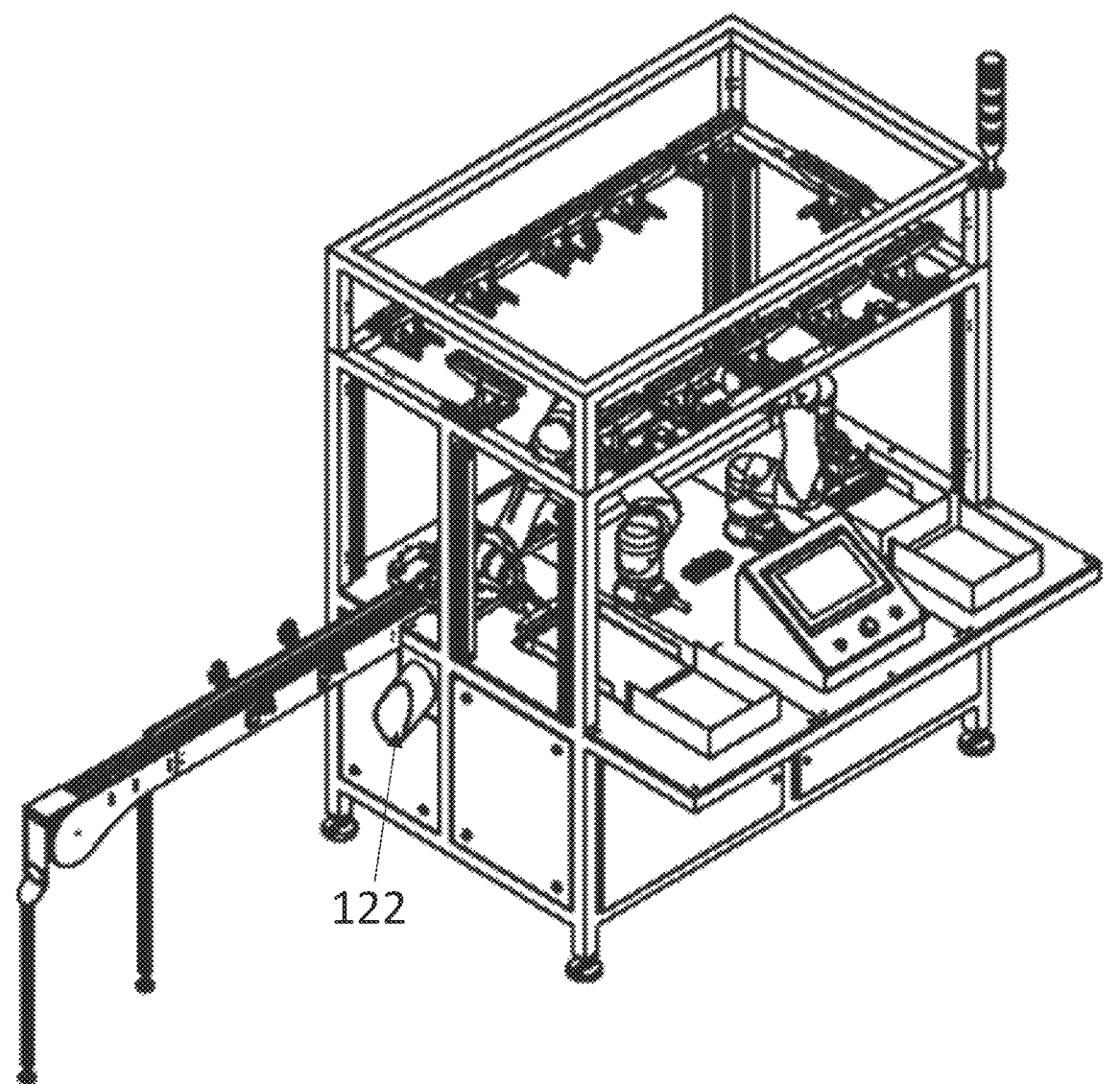
FIG. 1B shows a front perspective view of a multi-axis robotic vial loading system according to one embodiment of the present invention.

In some embodiments, as shown in FIG. 1A, the present invention includes a multi-axis robotic vial loading system comprising a conveyor belt 102, a container trap 104, a first multi-axis robot 106 with a first interchangeable gripper, a second multi-axis robot 108 with a second interchangeable gripper, a first tray station 110, a second tray station 112, an operator control panel 114, a plurality of rows of grippers of different sizes 116, and at least one vial guide 118. The conveyor belt 102 is designed to move a plurality of containers (e.g., vials) to the first multi-axis robot 106 and the second multi-axis robot 108 as shown by arrow 120. For example, and not limitation, the conveyor belt includes at least two conveyor belts. Each conveyor belt is designed to transport a single file line of containers (e.g., vials) to the first multi-axis robot or the second multi-axis robot. In other embodiments, the conveyor belt includes at least one belt to transport a plurality of vials to the first multi-axis robot and the second multi-axis robot. The container trap 104 is positioned on a side of the conveyor belt 102 and is designed to capture containers that fall off the conveyor belt. The container trap ejects vials that have fallen on the conveyor belt into a chute to remove the vials from the conveyor belt. The vial guide 118 is operable to move to adjust to a size of a plurality of vials. For example, and not limitation, in some embodiments, the vial guide 118 is movable in a vertical direction. Alternatively, or additionally, the vial guide 118 is operable to move in a horizontal direction. In some embodiments, the multi-axis robotic vial loading system includes interlocked doors or light curtains to prevent equipment movement while accessing the interior of the system to ensure safe operation. FIG. 1B shows a front perspective view of a multi-axis robotic vial loading system according to one embodiment of the present invention. In some embodiments, the multi-axis robotic vial loading system includes a vial chute 122 for removal of vials.

In some embodiments, the at least one conveyor is operable for straight infeed. In some embodiments, the at least one conveyor belt includes at least two lanes. In some embodiments, at least two conveyor belts transport vials to one or more multi-axis robotic arms. Each conveyor belt of the at least two conveyor belts is operable to operate at a different speed based on vial size and targeted throughput.

The first multi-axis robot and the second multi-axis robot are designed to grab at least one vial from the conveyor belt via a corresponding interchangeable gripper. Each multi-axis robot is further operable to swap a corresponding interchangeable gripper with another interchangeable gripper positioned in the plurality of rows of grippers of varying sizes 116. For example, and not limitation, in some embodiments, the multi-axis robots automatically change grippers. Alternatively, or additionally, the interchangeable gripper of each multi-axis robot is manually changed. The interchangeable gripper is designed to pick up vials of different sizes, place the vials into trays, and push vials into trays in a row. For further example, and without limitation, the interchangeable gripper includes a vacuum gripper (e.g., electrical, pneumatic). The interchangeable gripper includes a swappable module designed to removably attach to a corresponding multi-axis robot. The interchangeable gripper further includes a vacuum generation component, and a gripping component. In some embodiments, the gripper includes a suction cup.

The operator control panel 114 includes a human machine interface (e.g., touchscreen). The operator control panel is in a wired connection with the first multi-axis robot, the second multi-axis robot, and the conveyor belt. Alternatively, or additionally, the operator control panel is wirelessly connected to the first multi-axis robot, the second multi-axis robot, and the conveyor belt. The operator control panel is operable to control the activation and deactivation of the first multi-axis robot, the second multi-axis robot, and the conveyor belt. The operator control panel is further designed to automatically position the first multi-axis robot and/or the second multi-axis robot based on the positioning of the conveyor belt. In some embodiments, the touchscreen provides a user interface designed to control the positioning of the first multi-axis robot and/or the second multi-axis robot. For example, and not limitation, each component of a multi-axis robot is separately controllable to provide a plurality of degrees of freedom. In some embodiments, the multi-axis robot is designed to move based on a selection of a component on the operator control panel and a selection of a direction (e.g., to the right).

In some embodiments, the operator control panel is designed for controlling and monitoring the multi-axis robotic vial loading system. For example, and not limitation, the operator control panel is designed for activation, deactivation, and alarm management of each component of the multi-axis robotic vial loading system. For further example, and not limitation, the operator control panel is operable to activate and/or deactivate the conveyor belt, the first multi-axis robot, and/or the second multi-axis robot. The operator control panel is further operable to monitor and identify component failures, vial problems (e.g., dropped vials, incorrect size), and other problems associated with the vial loading process. Advantageously, the operator control panel is operable to provide real-time status (e.g., activation status) of each component and corresponding alerts to provide a real-time condition of the entire multi-axis robotic vial loading system.

Figure 2A:
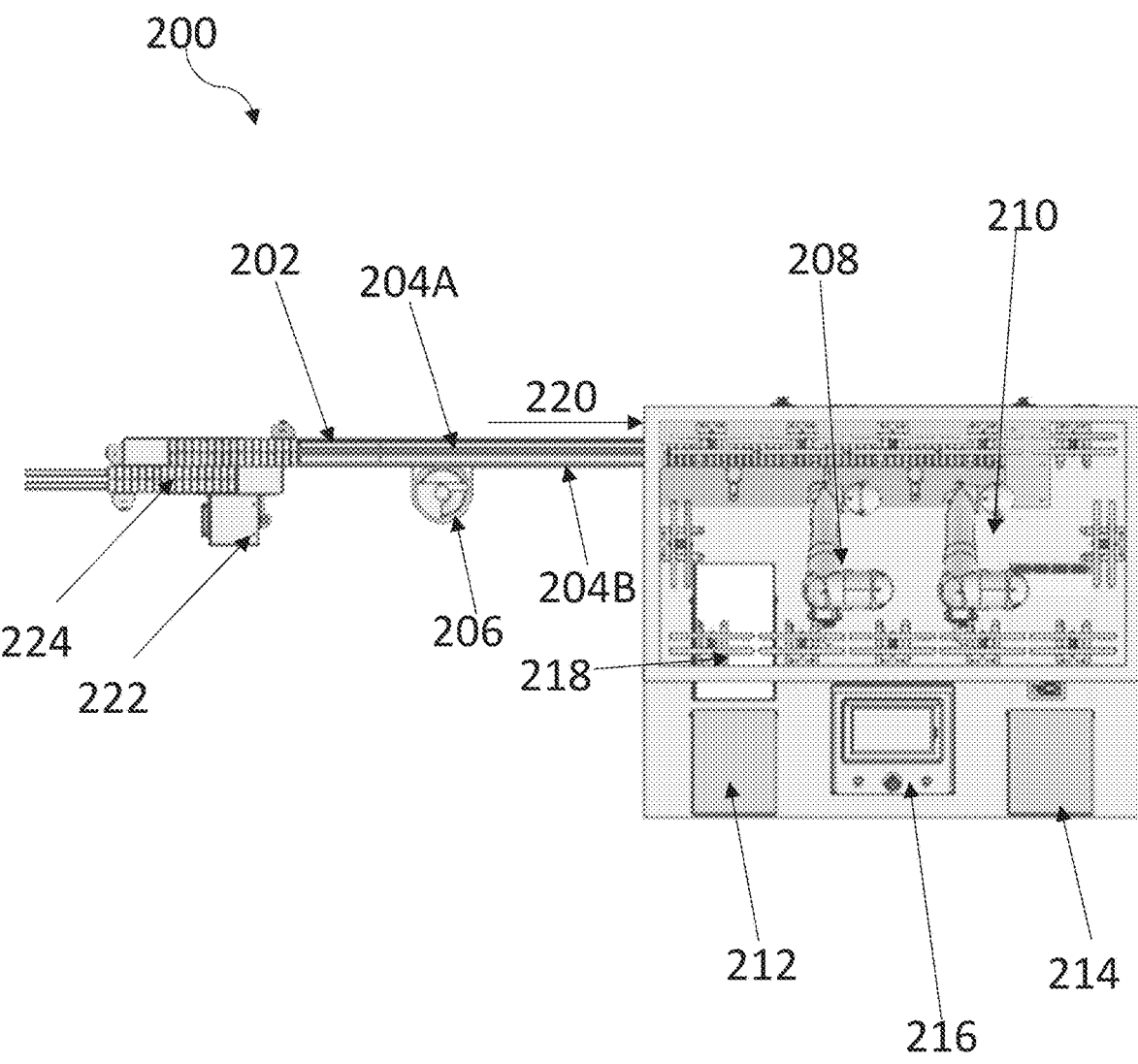
FIG. 2A shows a top view of a multi-axis robotic vial loading system according to one embodiment of the present invention.
Figure 2B:
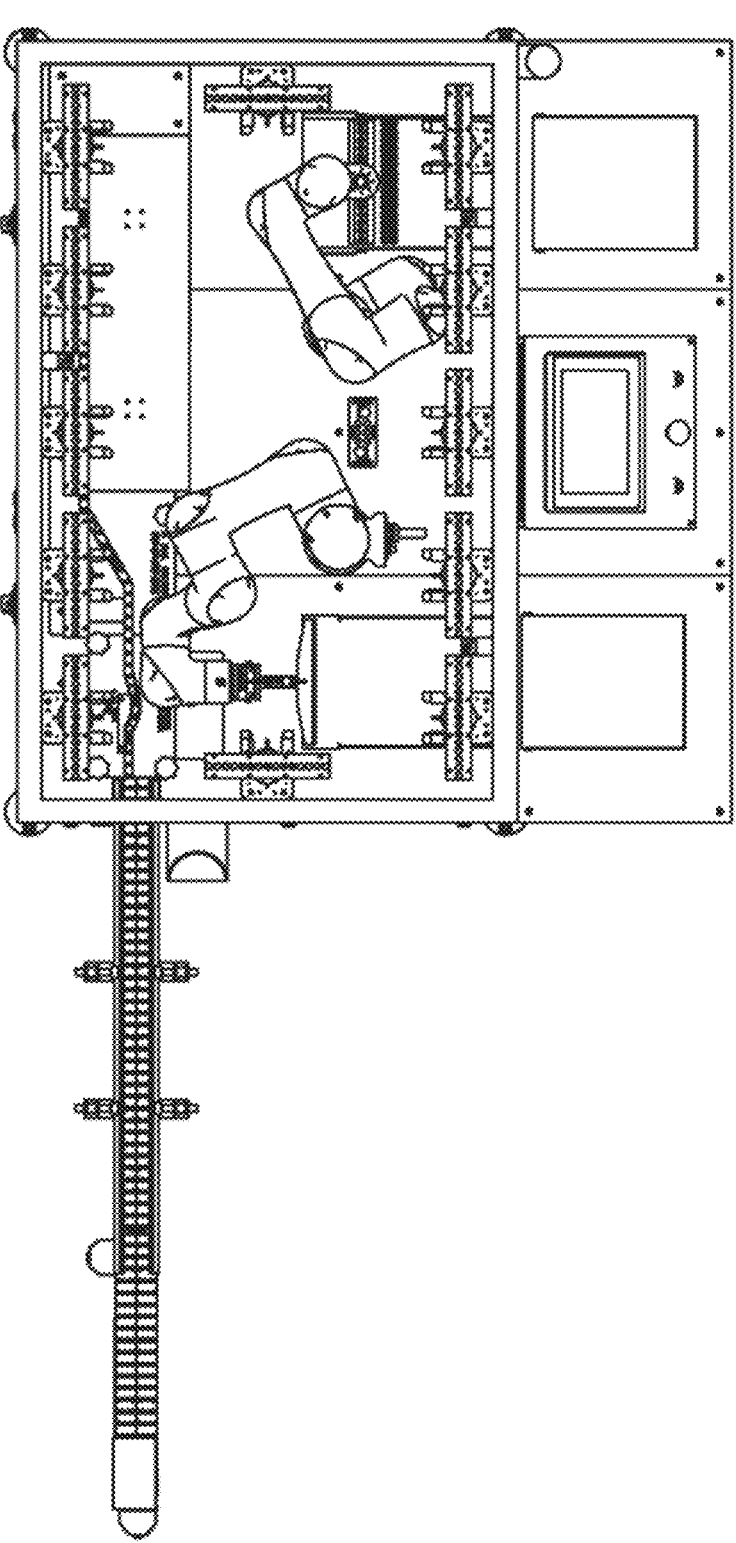
FIG. 2B shows a top view of a multi-axis robotic vial loading system according to one embodiment of the present invention.

FIGS. 2A-2B illustrate a top view of a multi-axis robotic vial loading system according to one embodiment of the present invention. In some embodiments, the present invention includes a multi-axis robotic vial loading system 200 comprising a conveyor belt 202 with a first belt 204A and a second belt 204B, a container trap 206, a first multi-axis robot 208 with a first interchangeable gripper, a second multi-axis robot 210 with a second interchangeable gripper, a first tray station 212, a second tray station 214, an operator control panel 216, and a plurality of rows of grippers of different sizes 218. In some embodiments, the multi-axis robotic vial loading system includes a drive motor 222 for powering the conveyor belt. In some other embodiments, the multi-axis vial loading system 200 is designed to receive vials from an upstream source via another conveyor belt 224 or similar transportation method. For example, and not limitation, in some embodiments, the multi-axis vial loading system further includes a guide for positioning the vials received from the upstream source to the conveyor belt 202. For further example, and not limitation, the upstream source includes a rotary accumulation table, an inline conveyor, an accumulation conveyor, and/or direct connection to other upstream processes and/or equipment. The conveyor belt 202 is designed to move a plurality of containers (e.g., vials) to the first multi-axis robot 208 and the second multi-axis robot 210 as shown by arrow 220. The container trap 206 is positioned on a side of the conveyor belt 202 and is designed to capture containers that fall off the conveyor belt 202. In some embodiments, the first tray station 212 and second tray station 214 include automatic tray capture devices to prevent slipping of the trays and include automatic capture of the tray receivers to reduce changeover effort when changing tray configurations.

Figure 3:
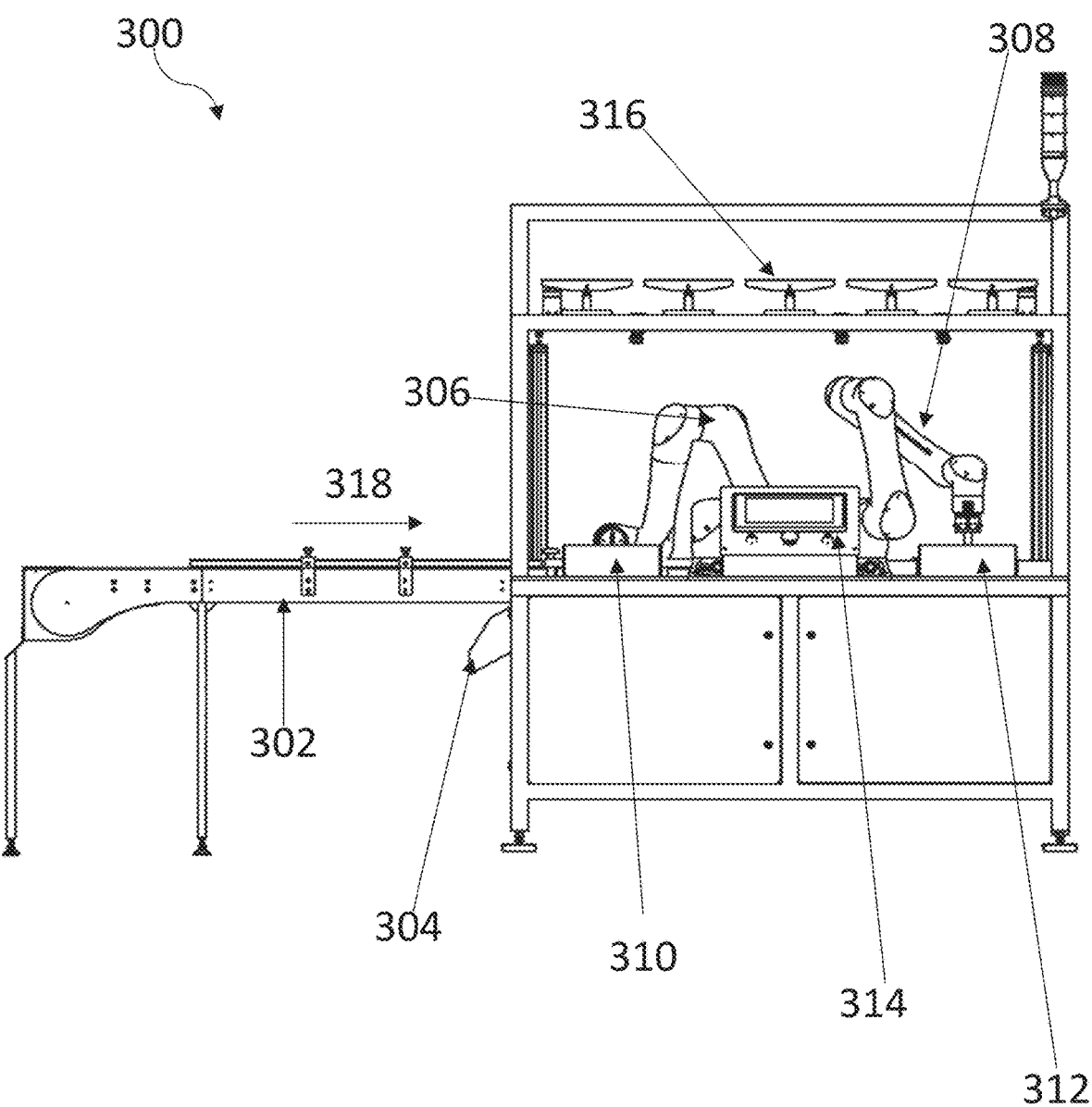
FIG. 3 shows a front view of a multi-axis robotic vial loading system according to one embodiment of the present invention.

FIG. 3 illustrates a front view of a multi-axis robotic vial loading system according to one embodiment of the present invention. The multi-axis robotic vial loading system 300 includes a conveyor belt 302, a container trap chute 304, a first multi-axis robot 306 with a first interchangeable gripper, a second multi-axis robot 308 with a second interchangeable gripper, a first tray station 310, a second tray station 312, an operator control panel 314, and a plurality of rows of grippers of different sizes 316. The conveyor belt 302 is designed to move a plurality of containers (e.g., vials) to the first multi-axis robot and the second robot as shown by arrow 318. In some embodiments, a container trap is positioned on a side of the conveyor belt 302 and is designed to capture containers that fall off the conveyor belt. In some embodiments, the conveyor belt includes a belt positioned to run to the first multi-axis robot and a second belt positioned to run to the second multi-axis robot. The first multi-axis robot and second multi-axis robot are designed to grab one or more vials from the conveyor belt and transport the one or more vials to the first tray station and/or the second tray station.

Figure 4:
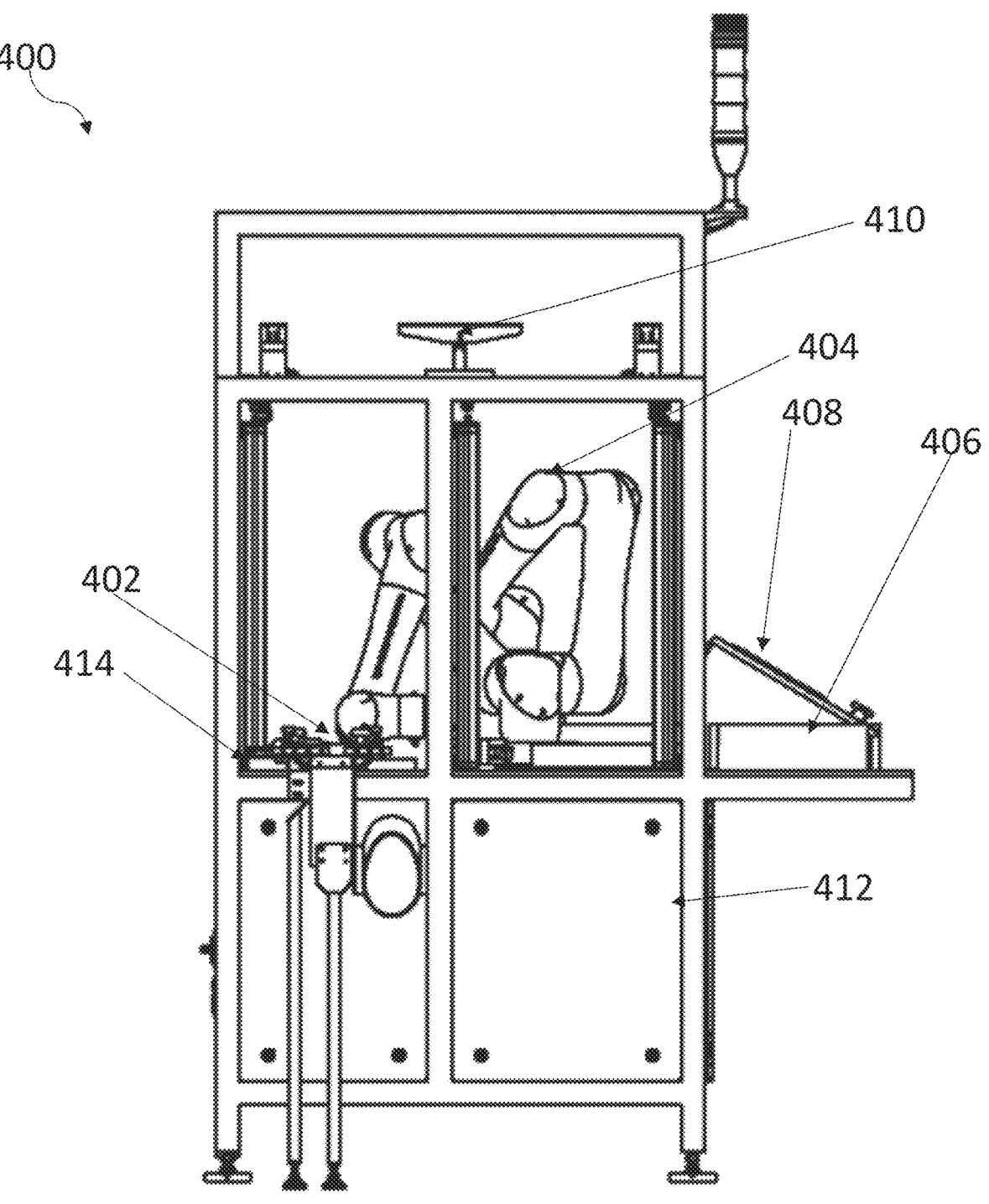
FIG. 4 shows a side view of a multi-axis robotic vial loading system according to one embodiment of the present invention.

FIG. 4 illustrates a rear view of a multi-axis robotic vial loading system according to one embodiment of the present invention. The multi-axis robotic vial loading system 400 includes a conveyor belt 402, a container trap (not shown), a multi-axis robot 404 with an interchangeable gripper, a tray station 406, an operator control panel 408, and a plurality of rows of grippers of different sizes 410. The conveyor belt 402 is designed to move a plurality of containers (e.g., vials) to the multi-axis robot 404. In some embodiments, the multi-axis robotic vial loading system further includes a second multi-axis robot with a second gripper and a second tray station. In some embodiments, the multi-axis robotic vial loading system includes at least one motor positioned within a cabinet 412 of the multi-axis robotic vial loading system that drives an infeed conveyor belt. In some embodiments, a second motor actuates an adjustable guide rail designed to keep vials on the conveyor belt.

Figure 5:
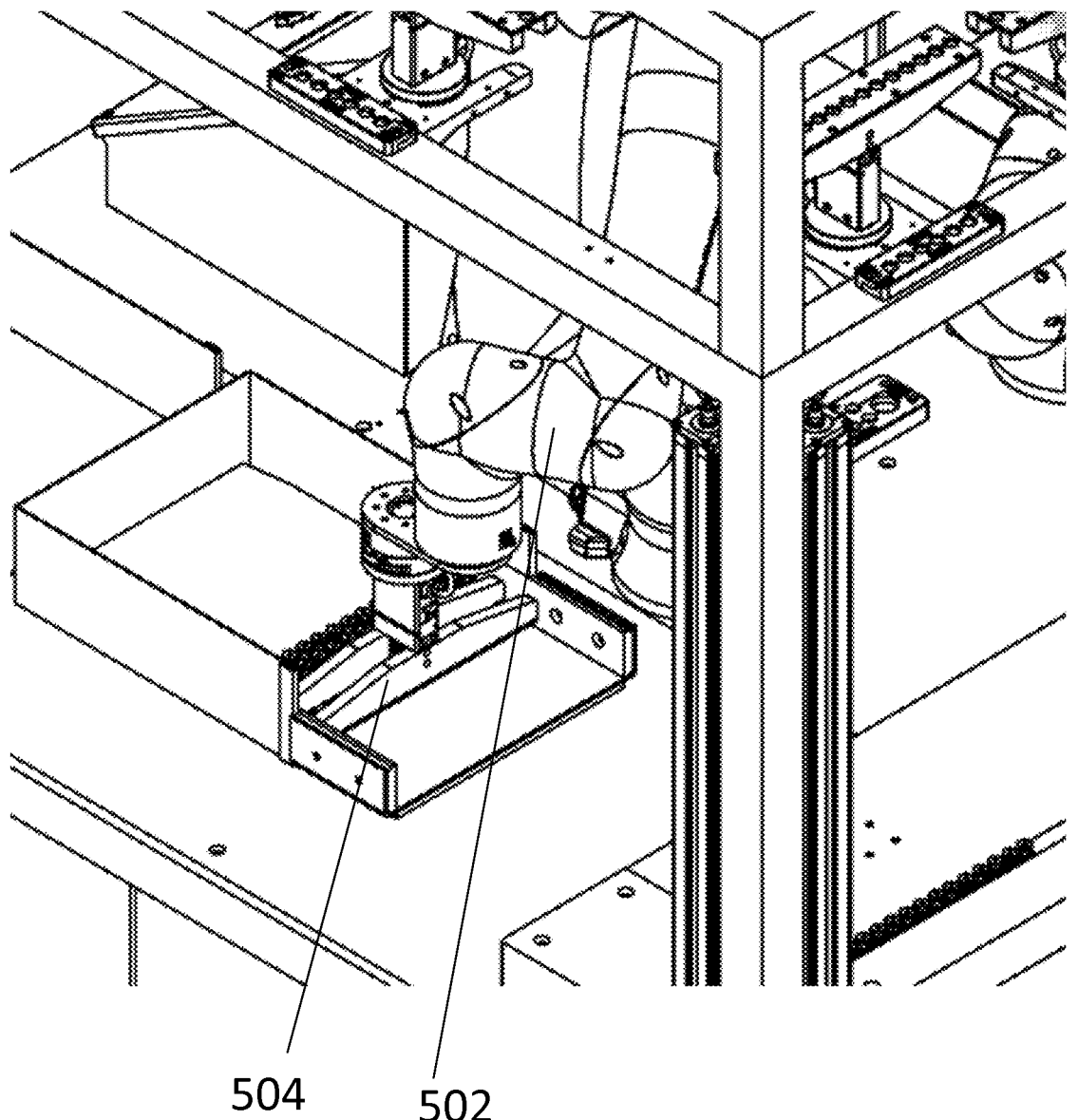
FIG. 5 illustrates a side perspective view of a multi-axis robot of a multi-axis robotic vial loading system according to one embodiment of the present invention.
Figure 6:
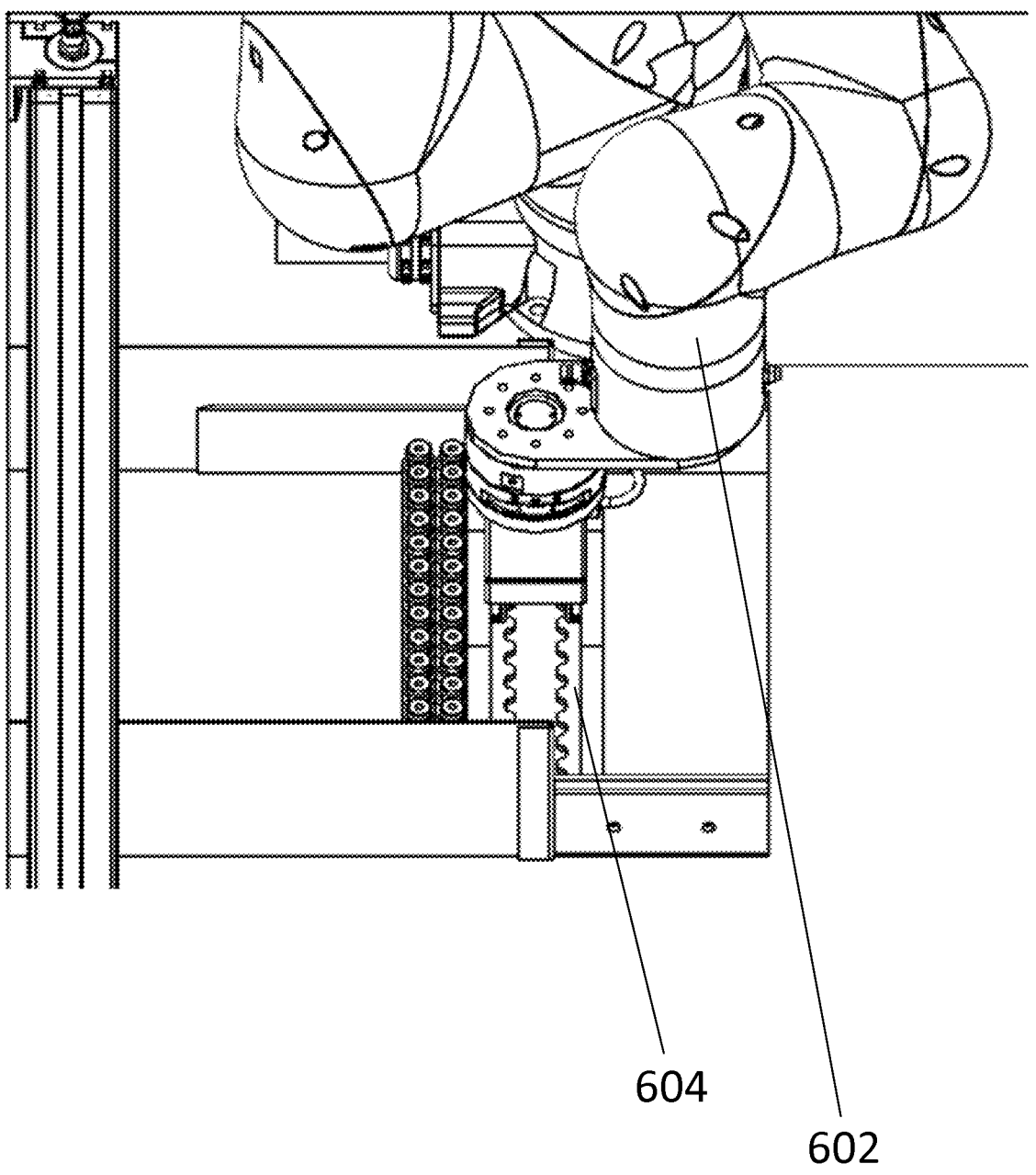
FIG. 6 illustrates a side view of a multi-axis robot of a multi-axis robotic vial loading system according to one embodiment of the present invention.
Figure 7:
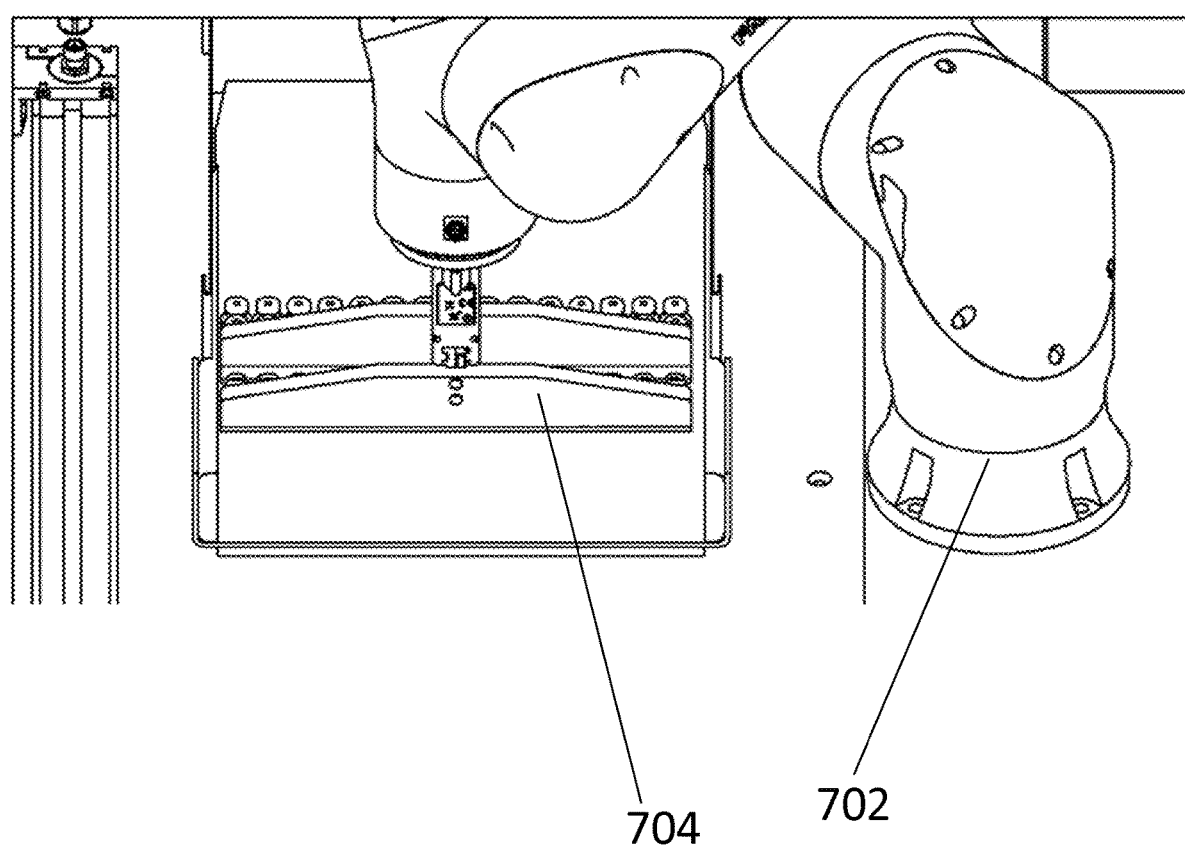
FIG. 7 illustrates a rear perspective view of a multi-axis robot of a multi-axis robotic vial loading system according to one embodiment of the present invention.

FIGS. 5-7 illustrate views of a multi-axis robot of a multi-axis robotic vial loading system according to one embodiment of the present invention. The multi-axis robot (e.g., 502, 602, 702) includes a base, a gripper (e.g., 504, 604, 704), and a plurality of support components. For example, and not limitation, in some embodiments, the gripper and a corresponding gripper actuator is bolted to the multi-axis robot and connected via a cable or pneumatic tubing. In some embodiments, the multi-axis robotic vial loading system includes a robotic system as disclosed in U.S. Pat. Nos. 10,423,154 and 9,821,459, each of which is herein incorporated by reference in its entirety. In some embodiments, the gripper includes a pneumatic gripper with parallel or angular jaws. For example, and not limitation, the grippers include a Zimmer Group SERIES GPP 5.000 gripper, a Zimmer Group Series MGP800 gripper, a Zimmer Group Series GP gripper, a Zimmer Group Series GP400 gripper, and/or other similar grippers. For further example, and not limitation, the grippers are electrically actuated to an end of the multi-axis robot. In some embodiments, the multi-axis robot includes a tool changer (e.g., Zimmer GROUP HWR series, WWR series and/or FWR series tool changers) designed to electrically engage and disengage from the gripper and/or the multi-axis robotic arm. Advantageously, the plurality of support components is connected such that the multi-axis robot is operable to move in at least two different directions (e.g., vertical and horizontal). In some embodiments, the multi-axis robot has at least five degrees of freedom. The multi-axis robot is designed to move at least one container (e.g., vial) from a first position (e.g., conveyor belt) to a second position (e.g., a tray). Advantageously, for improving packaging efficiency, the multi-axis robotic vial loading system is operable for the transporting vials from the conveyor belt to a plurality of trays while the conveyor belt is continuously moving. For example, and not limitation, the multi-axis vial loading system includes a vial sorting device that is operable to space out the vials at a designated rate to maintain continuous motion throughout the transportation process. In some embodiments, the multi-axis robot is designed to move a plurality of vials to a tray station.

Figure 8A:
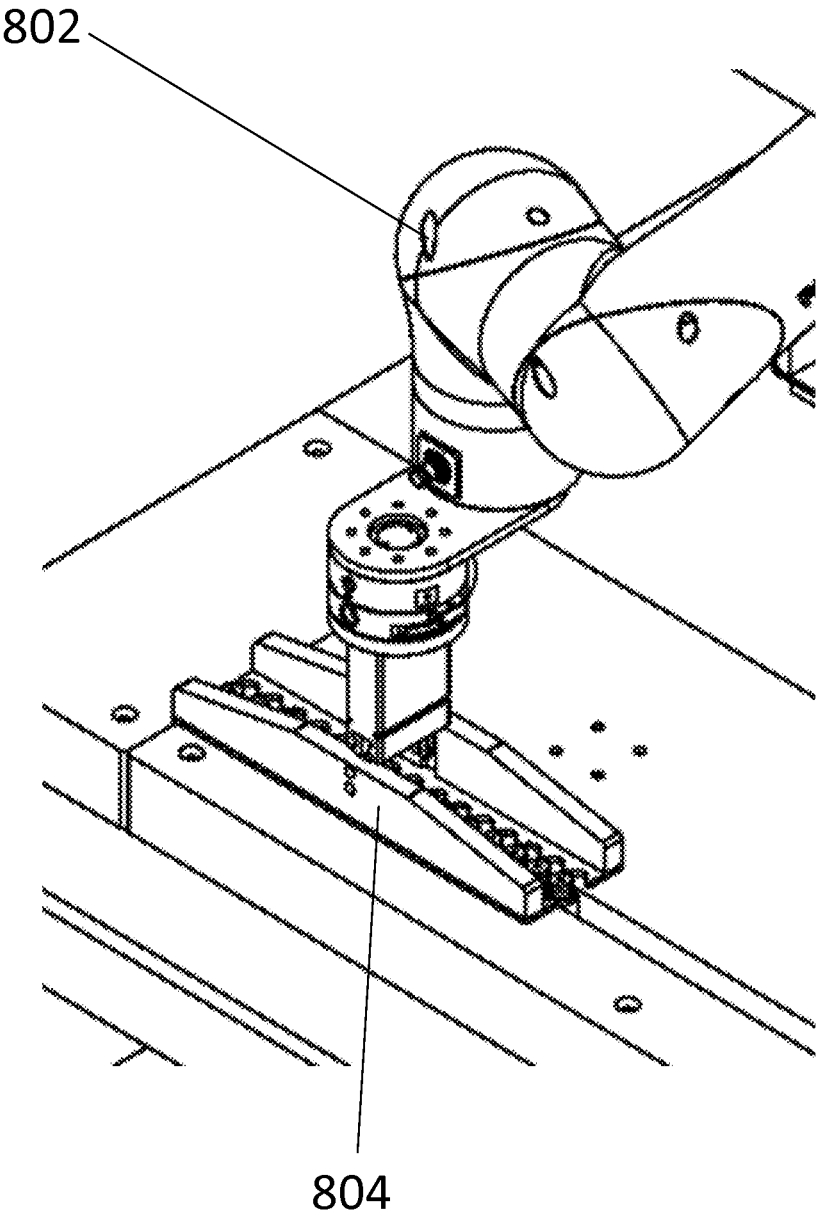
FIG. 8A illustrates a side perspective view of a multi-axis robot of a multi-axis robotic vial loading system in an open-gripper position according to one embodiment of the present invention.
Figure 8B:
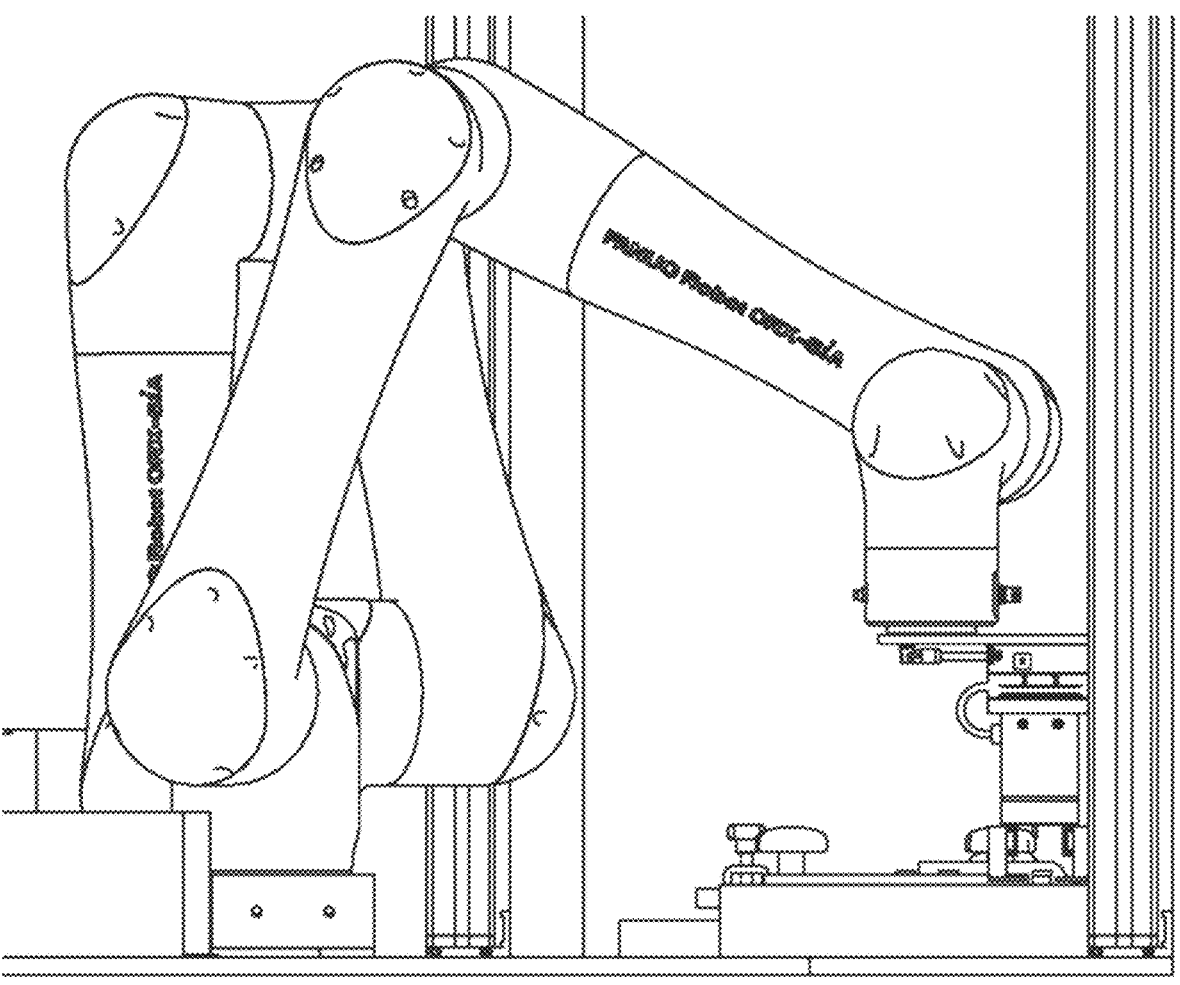
FIG. 8B illustrates a side view of a multi-axis robot of a multi-axis robotic vial loading system in an open-gripper position according to one embodiment of the present invention.
Figure 8C:
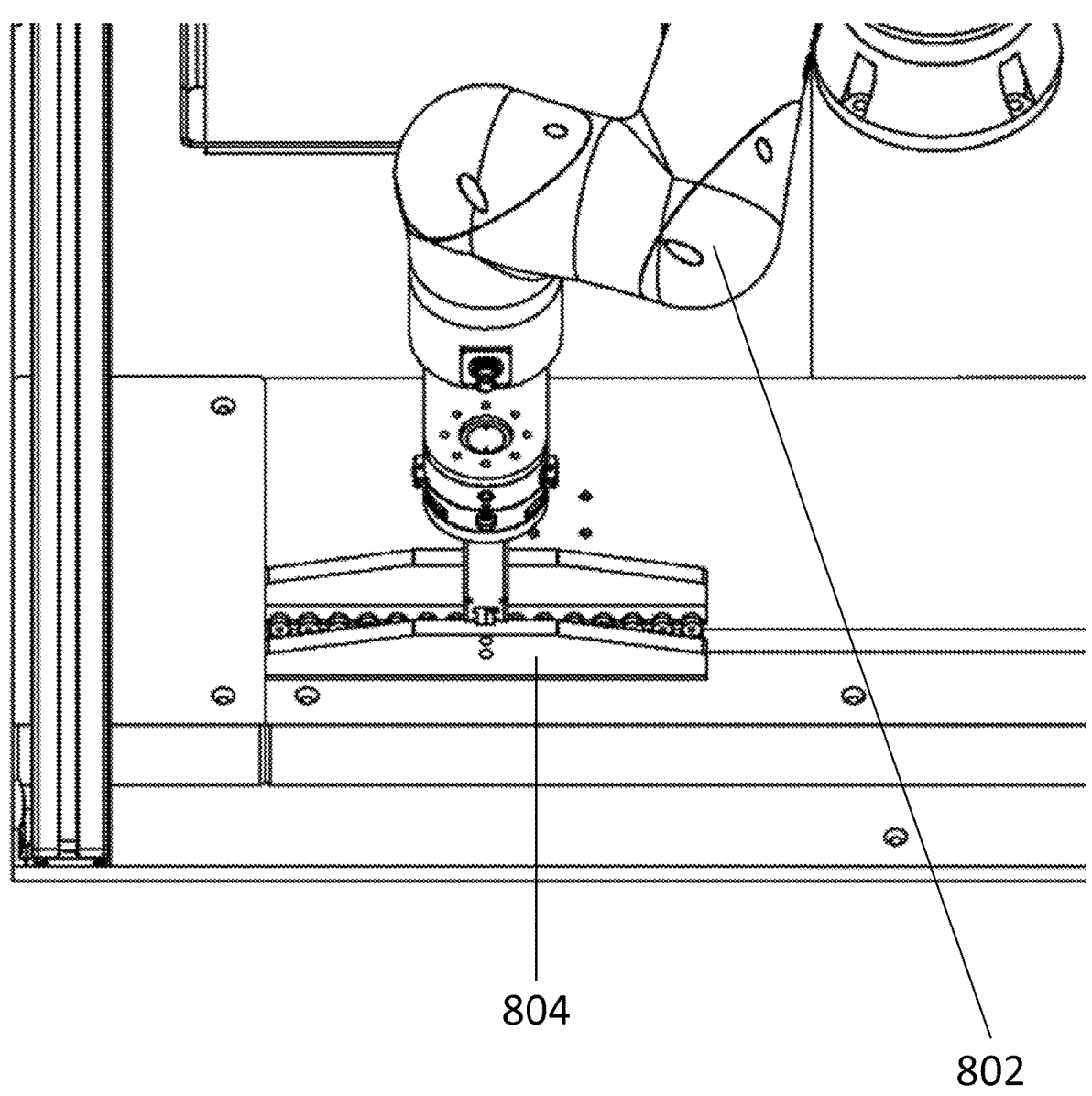
FIG. 8C illustrates a top view of a multi-axis robot of a multi-axis robotic vial loading system in an open-gripper position according to one embodiment of the present invention.
Figure 9A:
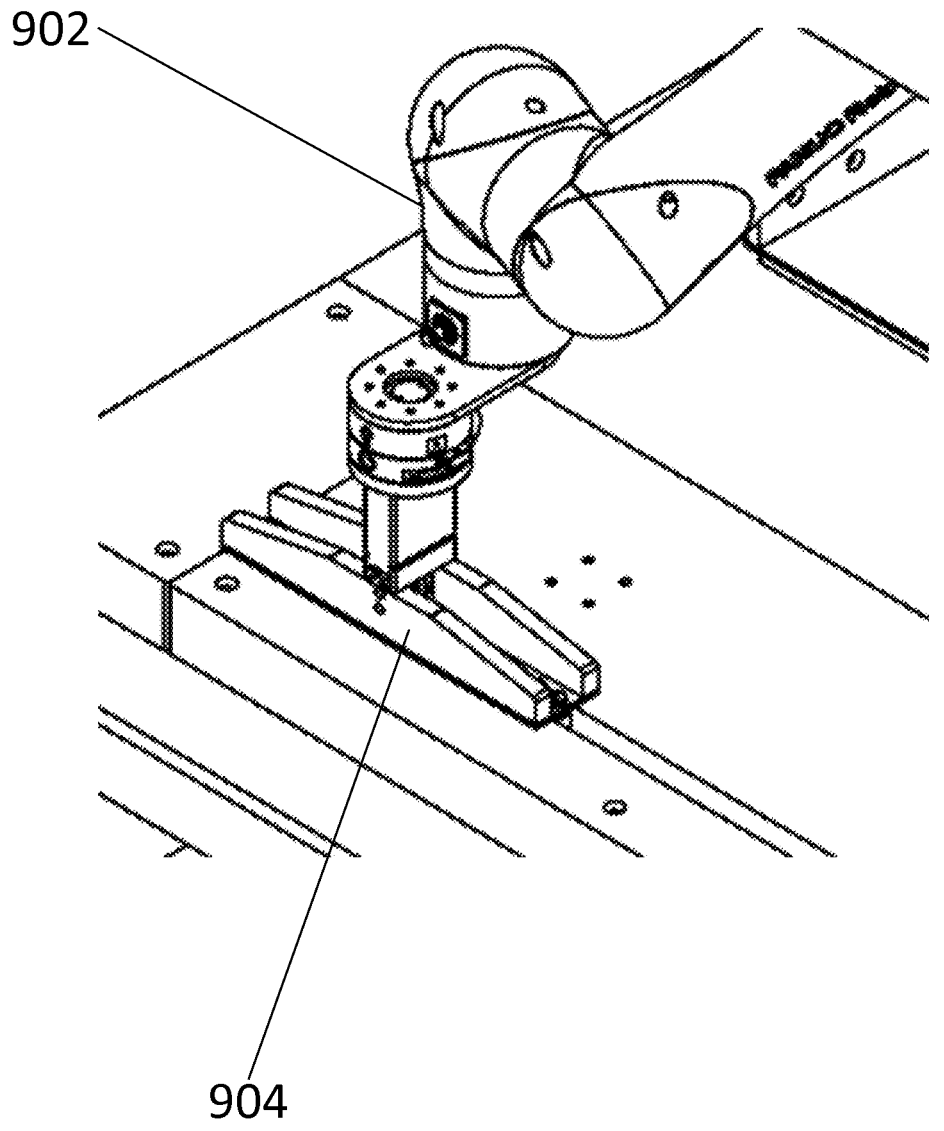
FIG. 9A illustrates a side perspective view of a multi-axis robot of a multi-axis robotic vial loading system in a closed-gripper position according to one embodiment of the present invention.
Figure 9B:
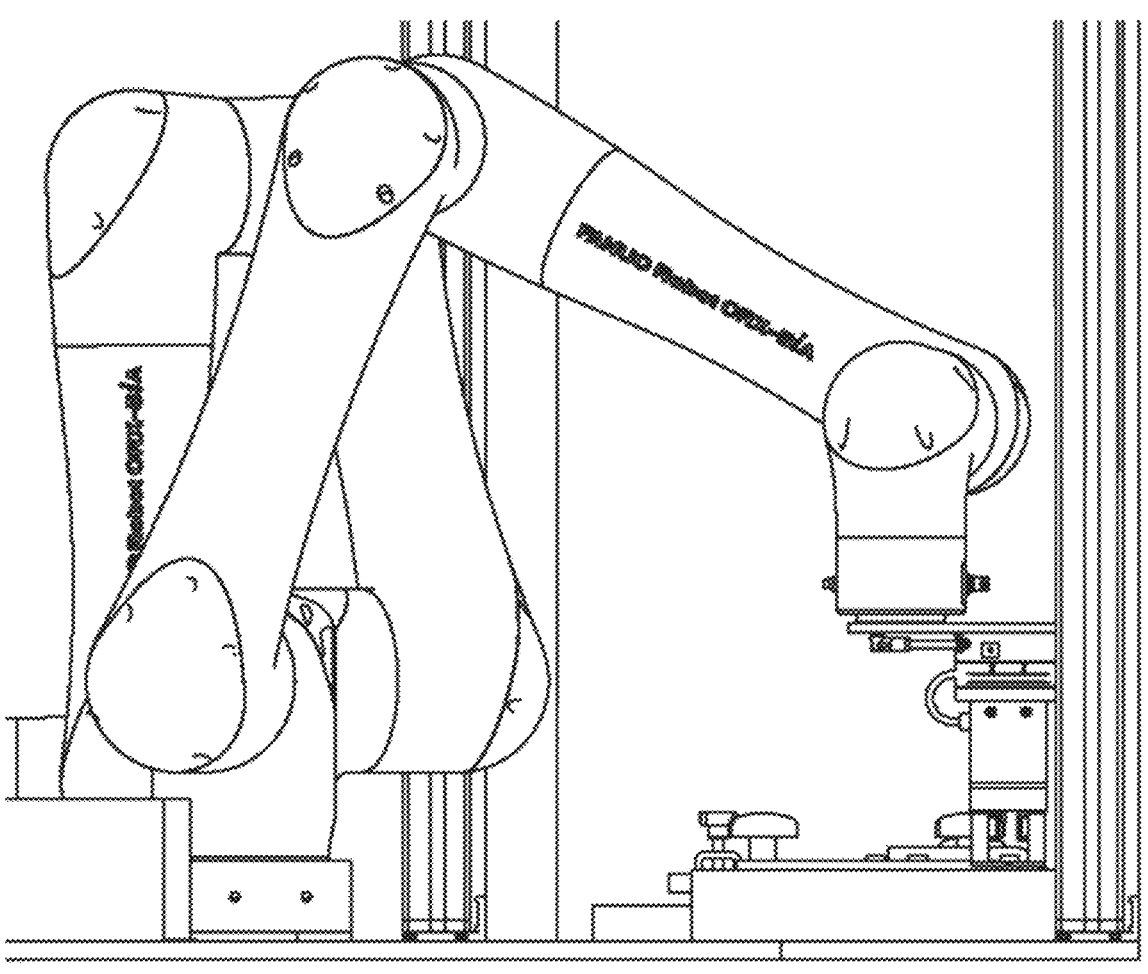
FIG. 9B illustrates a side view of a multi-axis robot of a multi-axis robotic vial loading system in a closed-gripper position according to one embodiment of the present invention.
Figure 9C:
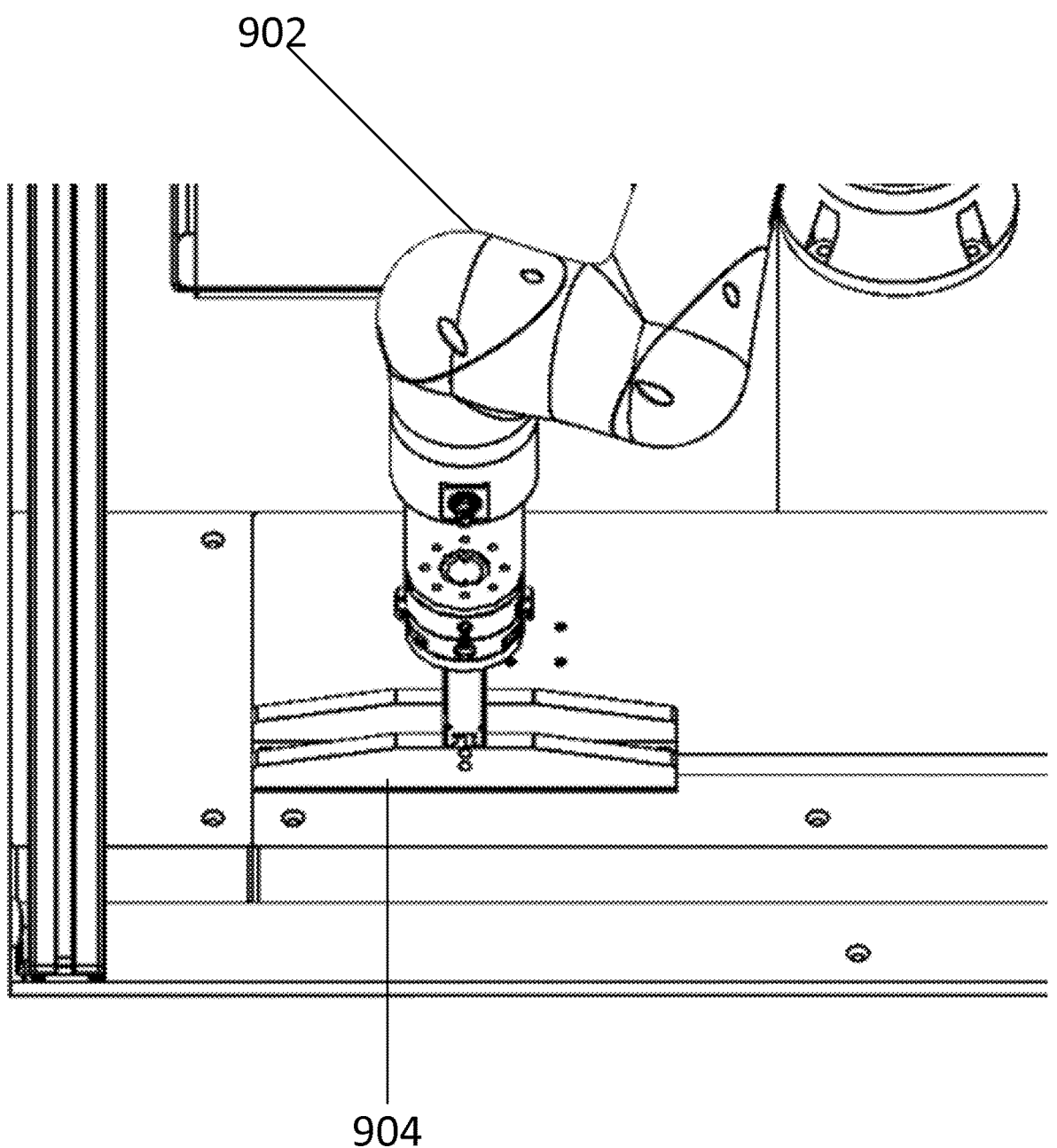
FIG. 9C illustrates a top view of a multi-axis robot of a multi-axis robotic vial loading system in a closed-gripper position according to one embodiment of the present invention.
Figure 10A:
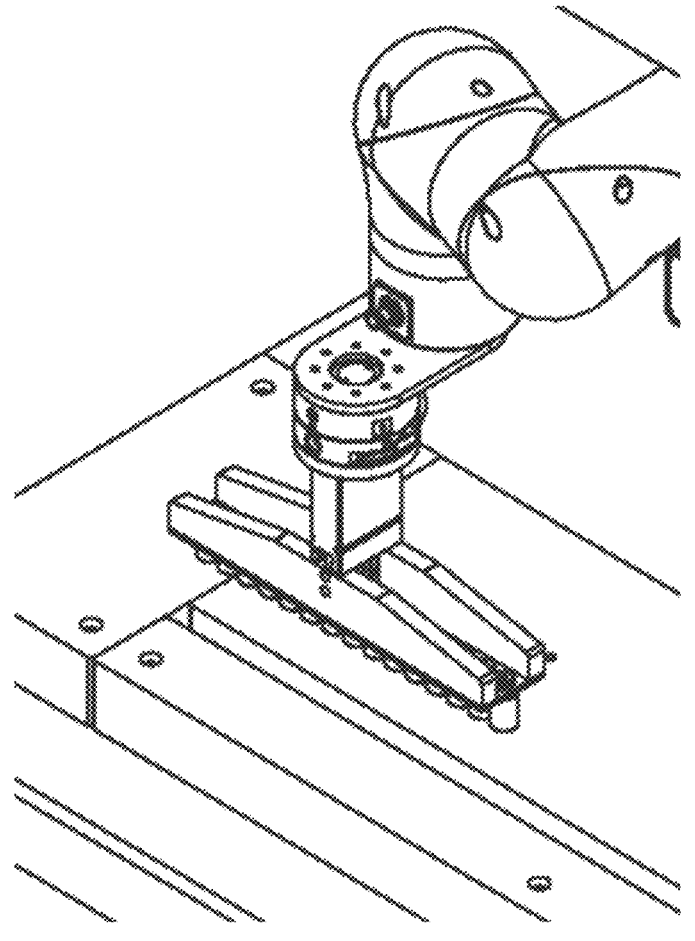
FIG. 10A illustrates a side perspective view of a multi-axis robot of a multi-axis robotic vial loading system transporting a plurality of vials according to one embodiment of the present invention.
Figure 10B:
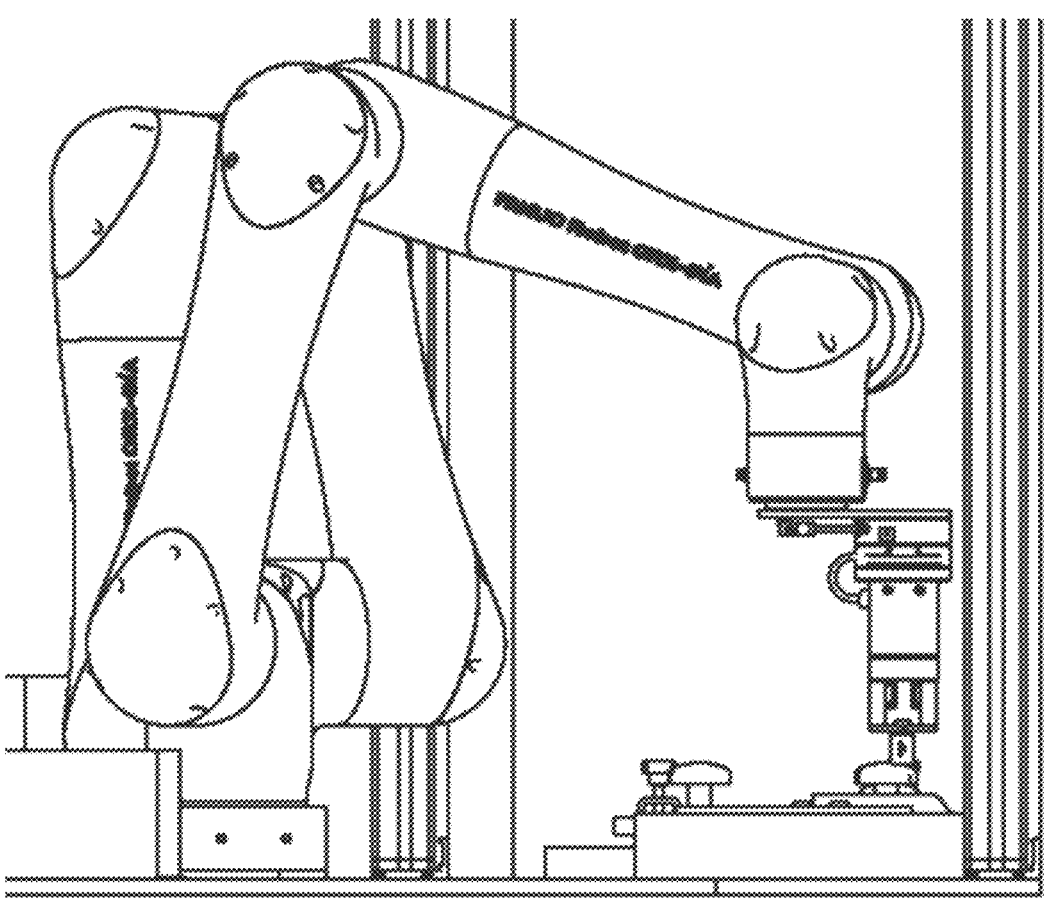
FIG. 10B illustrates a side view of a multi-axis robot of a multi-axis robotic vial loading system transporting a plurality of vials according to one embodiment of the present invention.
Figure 10C:
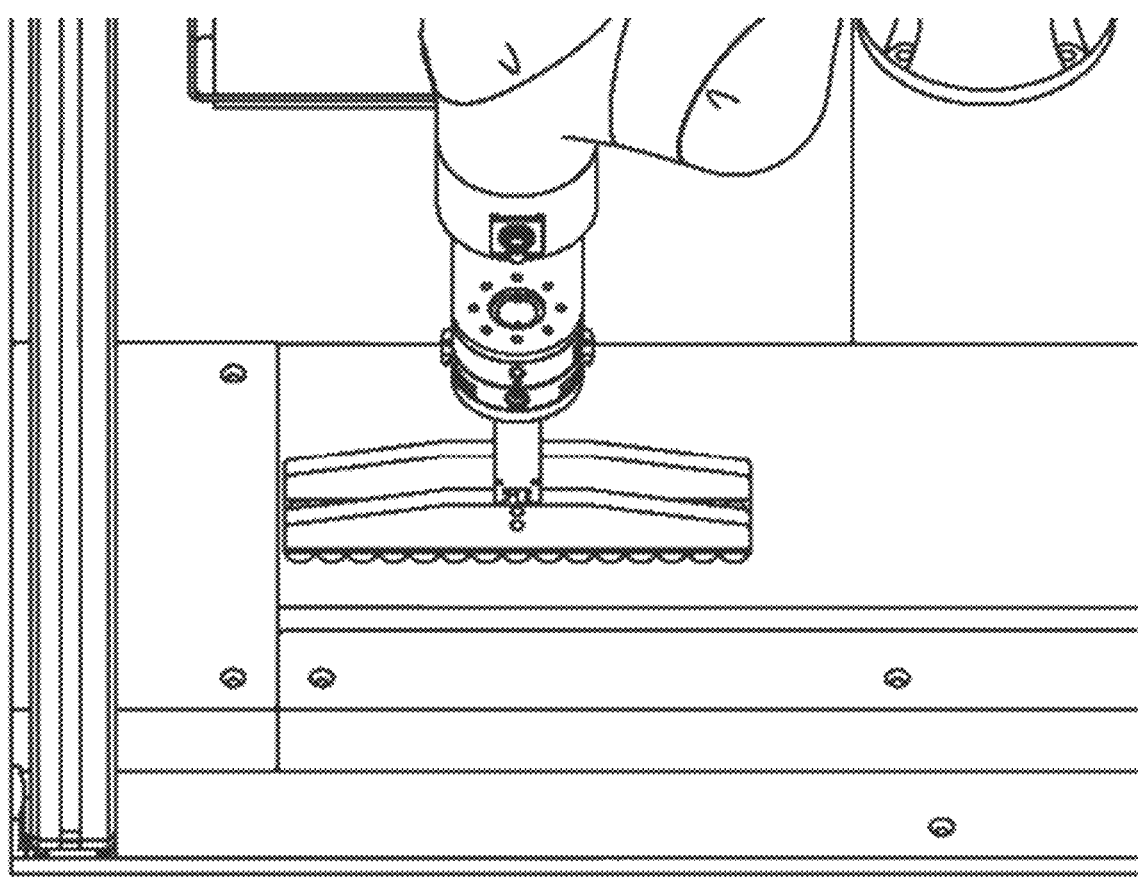
FIG. 10C illustrates a top view of a multi-axis robot of a multi-axis robotic vial loading system transporting a plurality of vials according to one embodiment of the present invention.
Figure 10D:
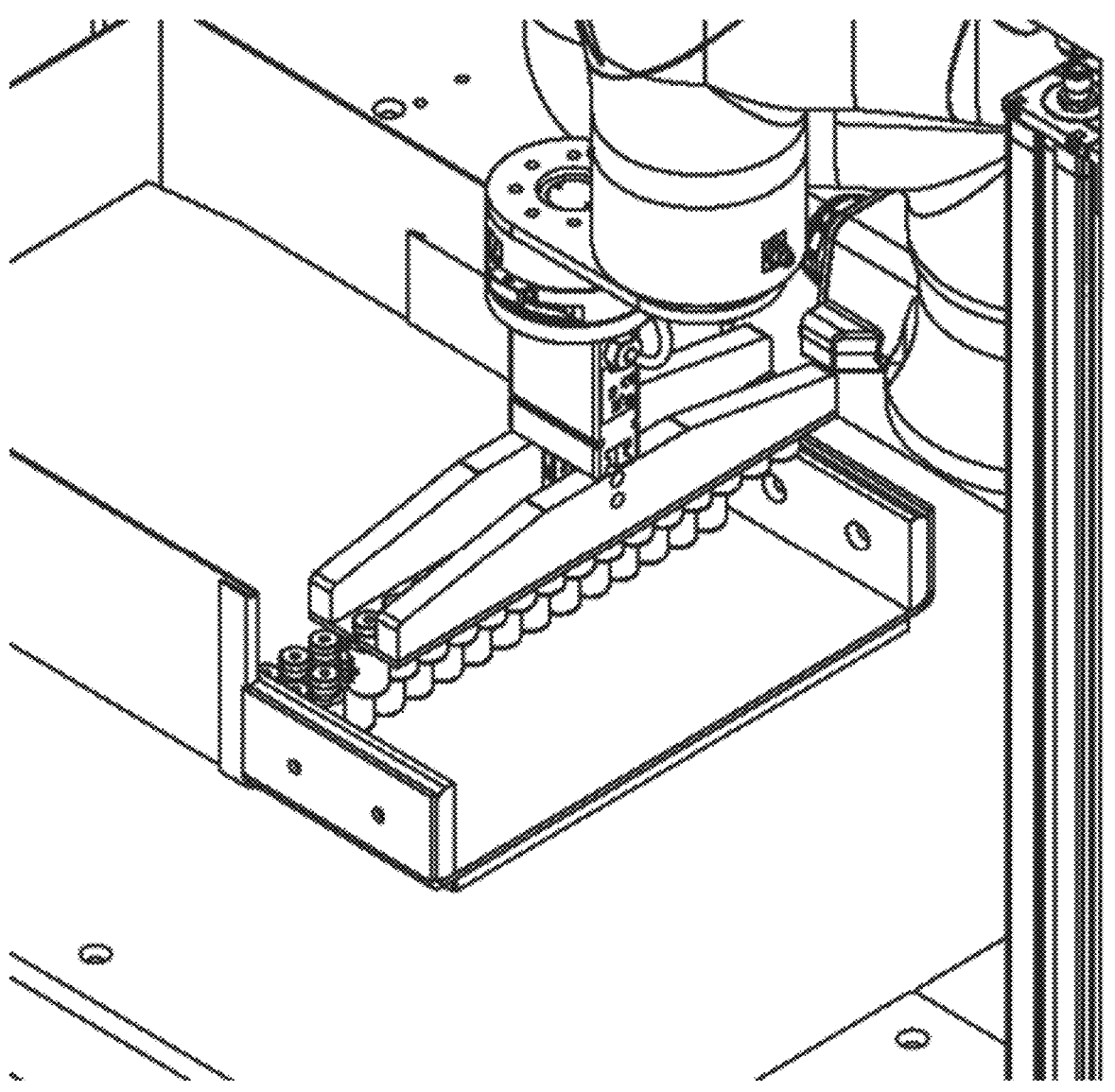
FIG. 10D illustrates a side perspective view of a multi-axis robot of a multi-axis robotic vial loading system transporting a plurality of vials according to one embodiment of the present invention.
Figure 10E:
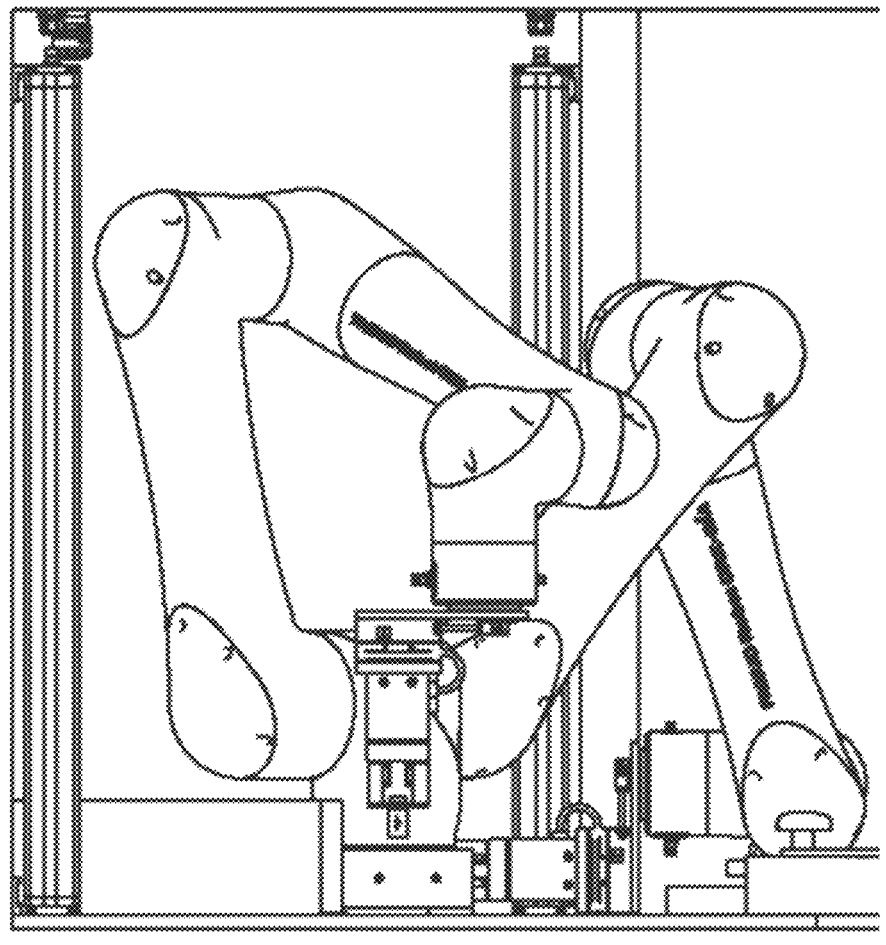
FIG. 10E illustrates a side view of a multi-axis robot of a multi-axis robotic vial loading system transporting a plurality of vials according to one embodiment of the present invention.
Figure 10F:
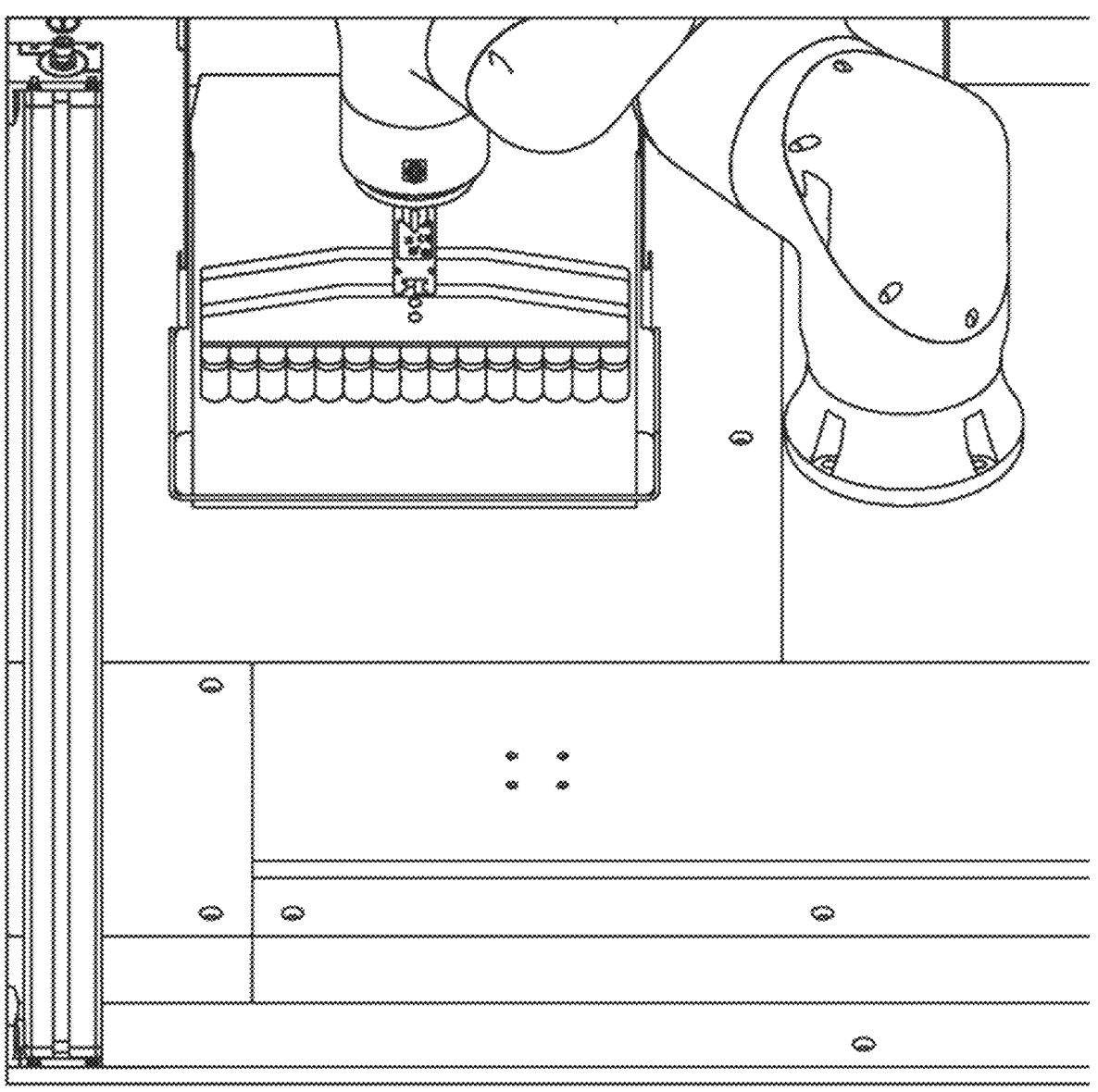
FIG. 10F illustrates a rear view of a multi-axis robot of a multi-axis robotic vial loading system transporting a plurality of vials according to one embodiment of the present invention.
Figure 11A:
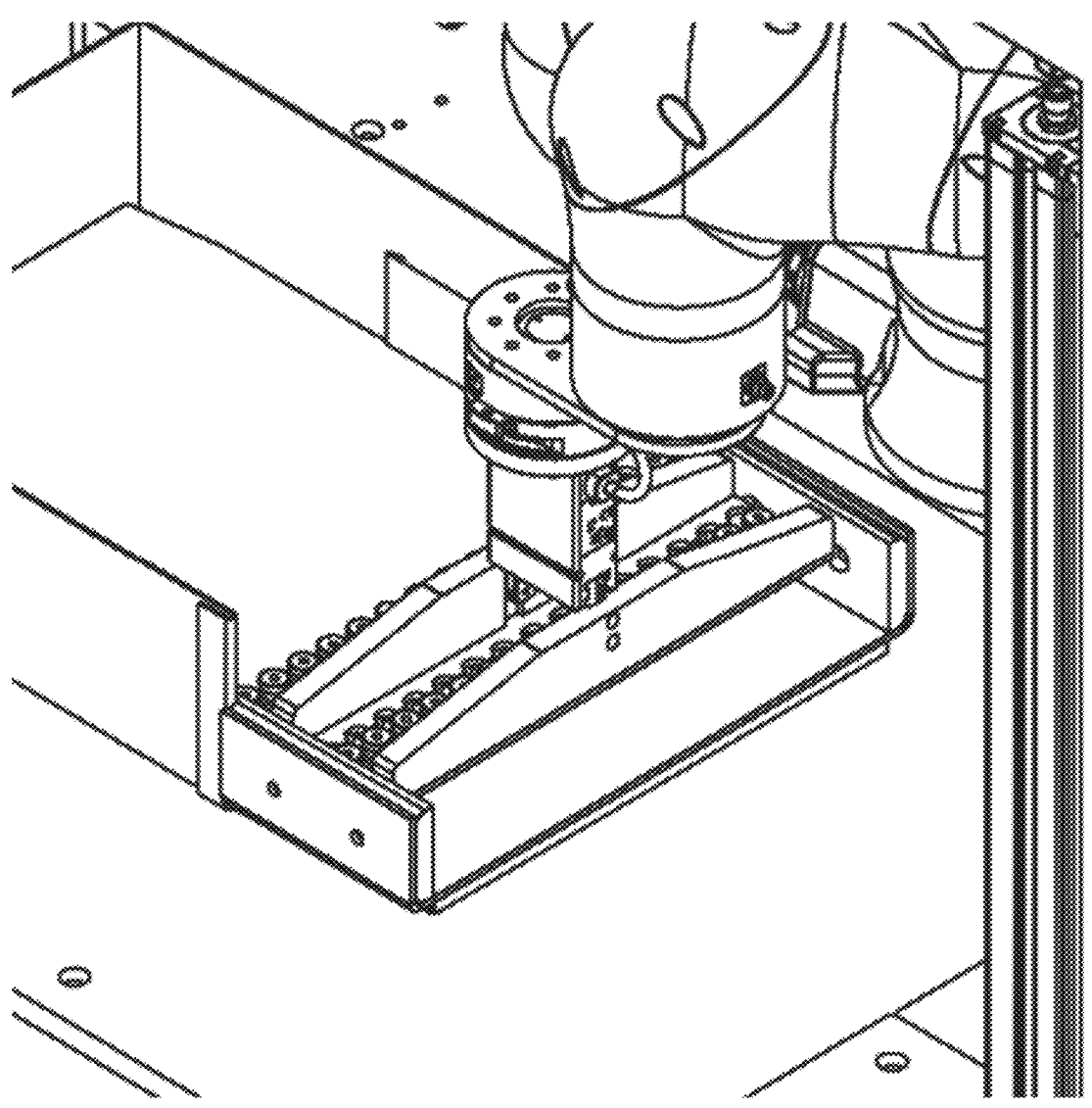
FIG. 11A illustrates a side perspective view of a multi-axis robot of a multi-axis robotic vial loading system loading a plurality of vials into a tray according to one embodiment of the present invention.
Figure 11B:
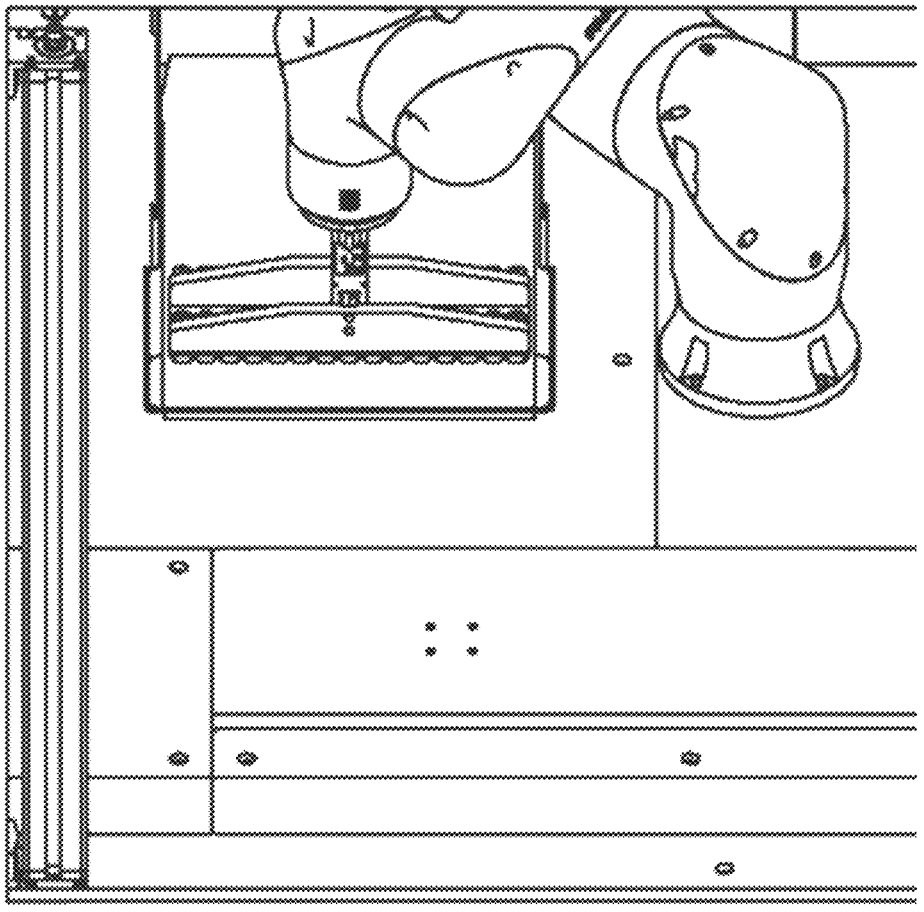
FIG. 11B illustrates a rear view of a multi-axis robot of a multi-axis robotic vial loading system loading a plurality of vials into a tray according to one embodiment of the present invention.
Figure 11C:
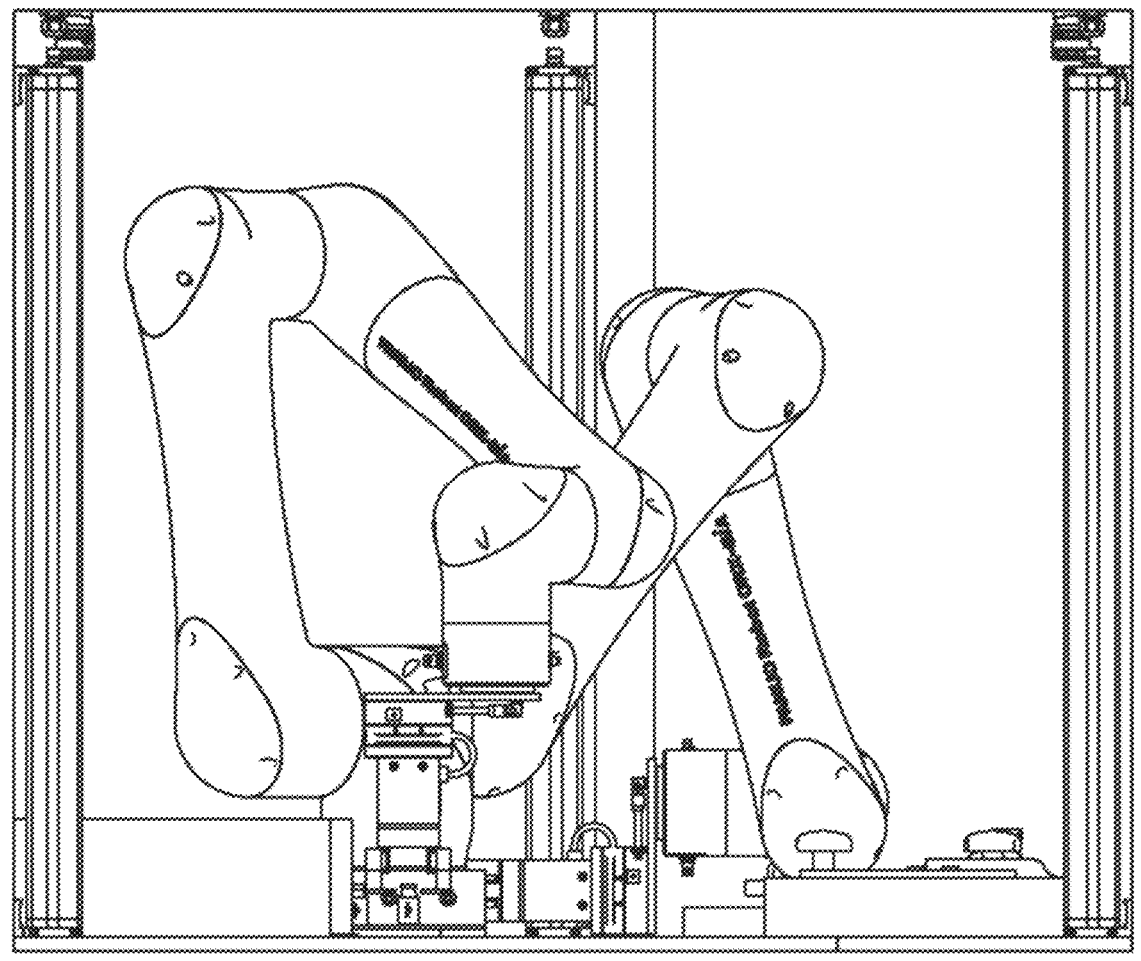
FIG. 11C illustrates a side view of a multi-axis robot of a multi-axis robotic vial loading system loading a plurality of vials into a tray according to one embodiment of the present invention.
Figure 12A:
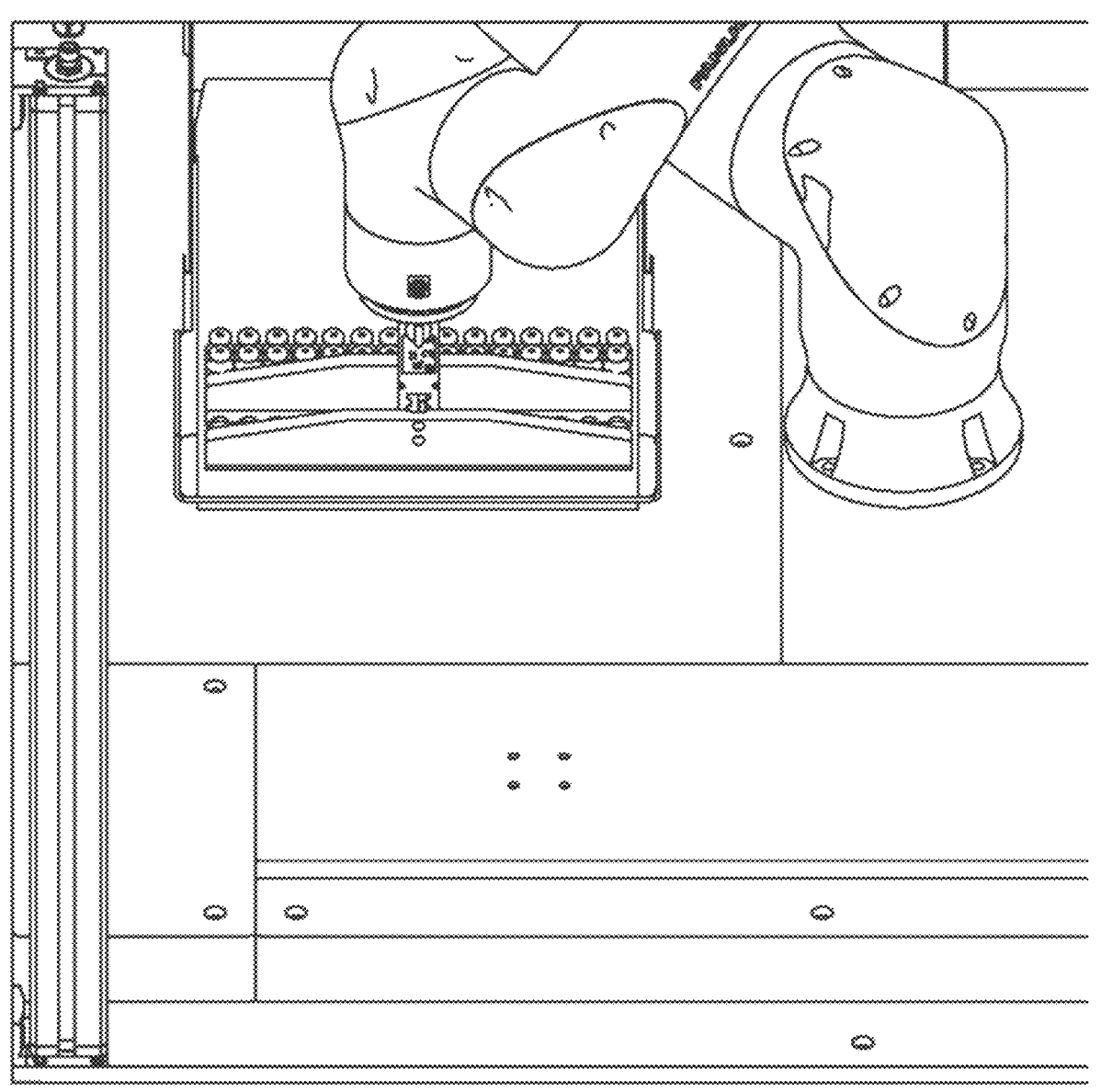
FIG. 12A illustrates a rear perspective view of a multi-axis robot of a multi-axis robotic vial loading system pushing a plurality of vials into a tray according to one embodiment of the present invention.
Figure 12B:
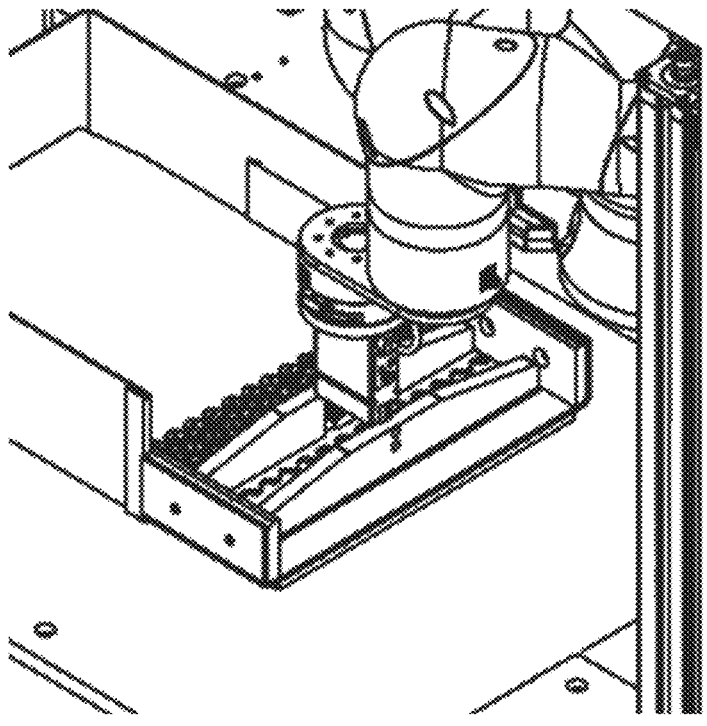
FIG. 12B illustrates a side perspective view of a multi-axis robot of a multi-axis robotic vial loading system pushing a plurality of vials into a tray according to one embodiment of the present invention.
Figure 12C:
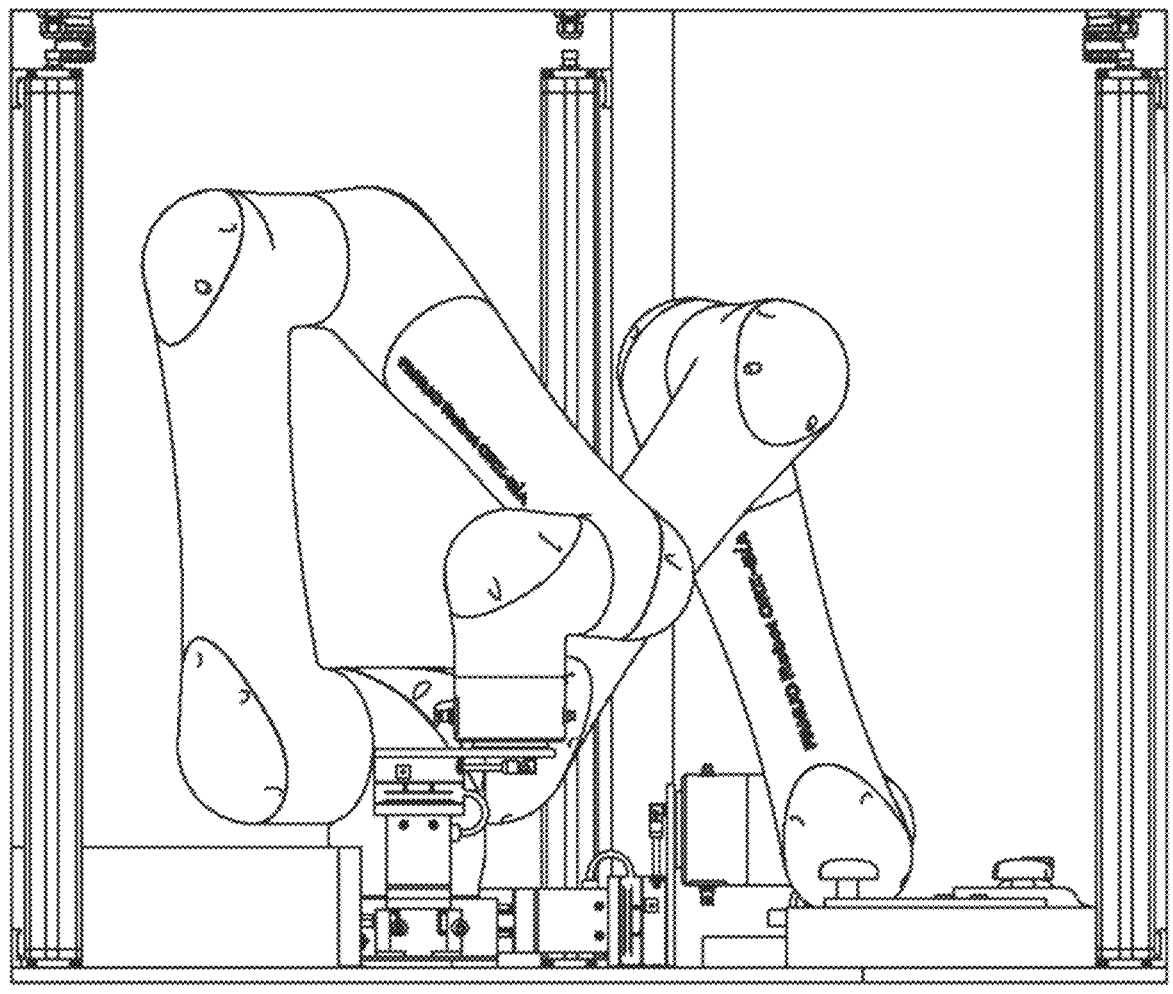
FIG. 12C illustrates a side view of a multi-axis robot of a multi-axis robotic vial loading system pushing a plurality of vials into a tray according to one embodiment of the present invention.
Figure 13A:
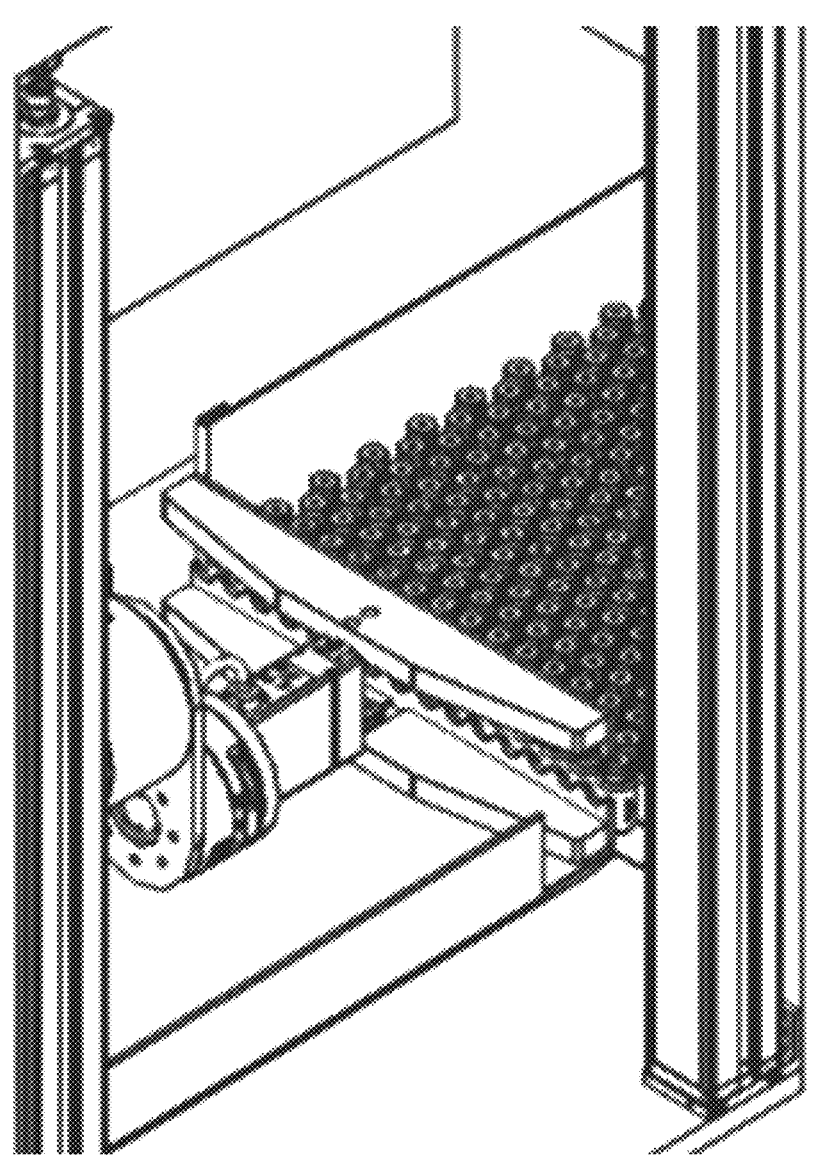
FIG. 13A illustrates a side perspective view of a multi-axis robot of a multi-axis robotic vial loading system and a loaded tray according to one embodiment of the present invention.
Figure 13B:
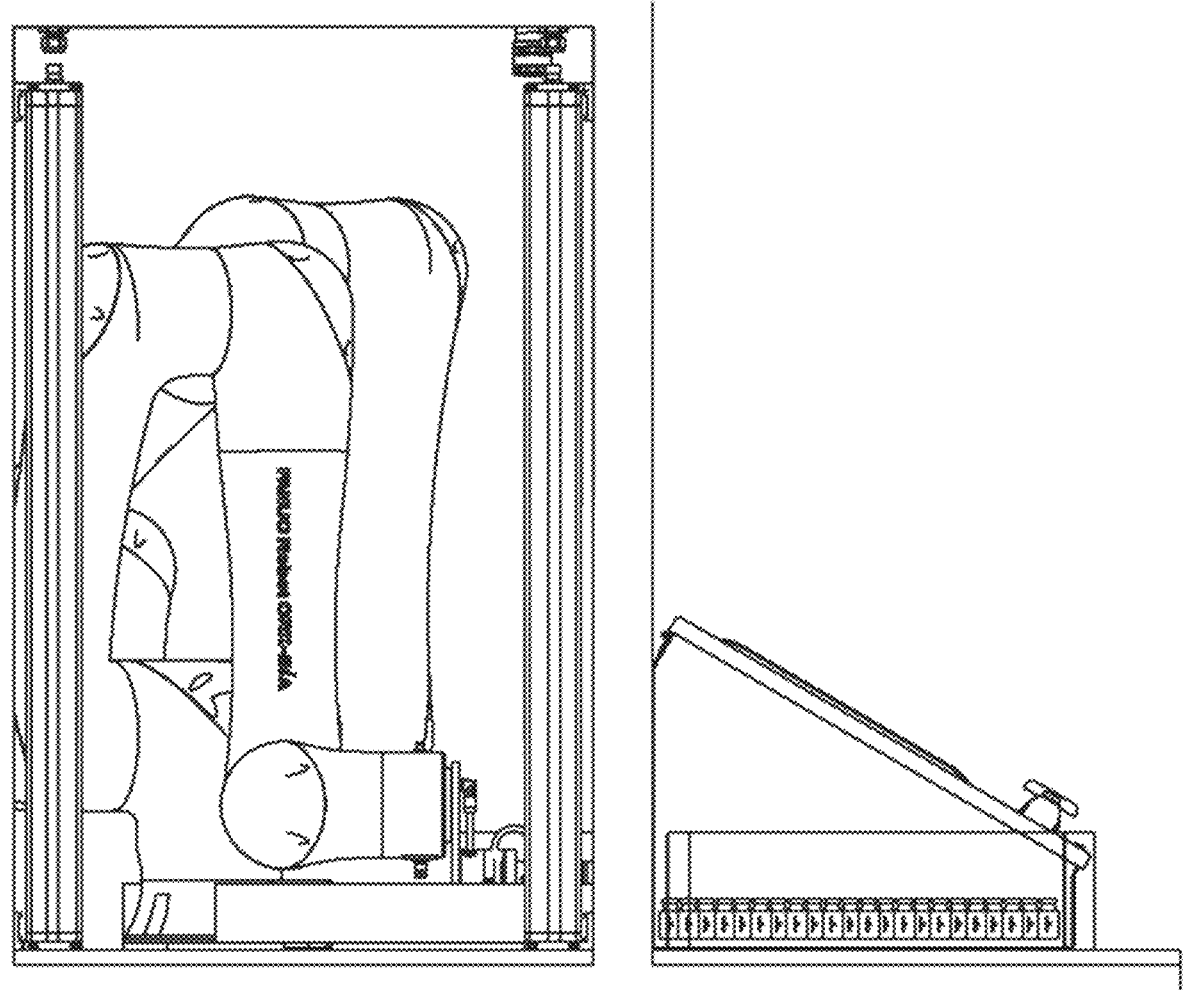
FIG. 13B illustrates a side view of a multi-axis robot of a multi-axis robotic vial loading system and a loaded tray according to one embodiment of the present invention.
Figure 13C:
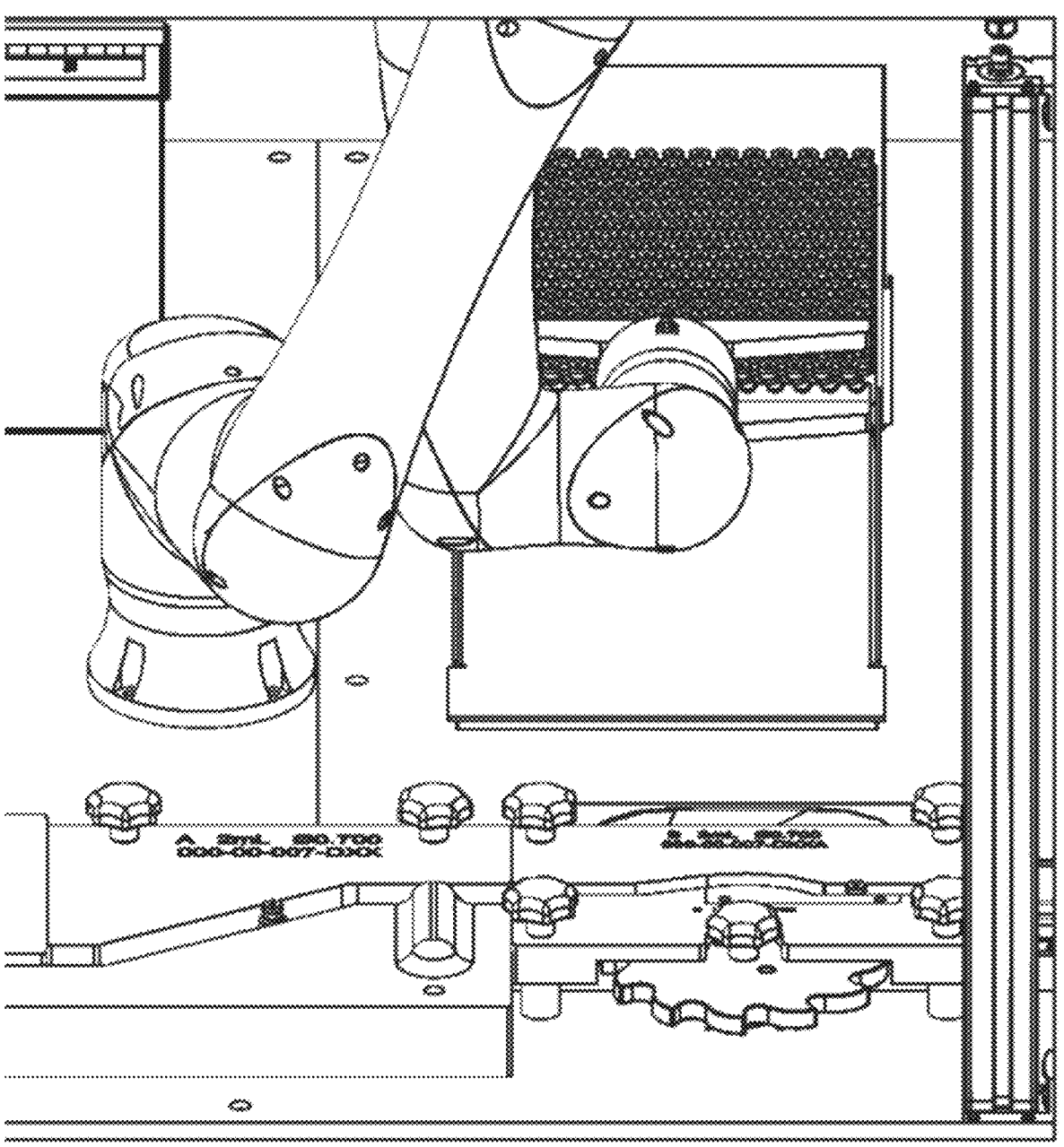
FIG. 13C illustrates a rear view of a multi-axis robot of a multi-axis robotic vial loading system and a loaded tray according to one embodiment of the present invention.

In some embodiments, the multi-axis robot of the multi-axis robotic vial loading system is designed to grab a plurality of vials utilizing a gripper attached to an end of the multi-axis robot. FIG. 8A illustrates a multi-axis robot 802 including a gripper 804 in an open position. FIG. 9A illustrates a multi-axis robot 902 including a gripper 904 in a closed position. The gripper is operable to move between an open position, as shown in FIGS. 8A-8C, to a closed position, as shown in FIGS. 9A-9C, to surround and secure a plurality of vials. After the plurality of vials are secured, as shown in FIGS. 10A-F, the multi-axis robot is designed to transport the plurality of vials from a conveyor belt to a tray station. As illustrated in FIGS. 11A-11C, the multi-axis robot is designed to lower the plurality of vials into the tray station. Once the vials are in the tray station, the gripper is designed to move from the closed position to the open position to release the plurality of vials. Further, as illustrated in FIGS. 12A-12C, the multi-axis robot is designed to position the gripper to the rear of the tray station and push the plurality of vials to the front of the tray station. Advantageously, this enables the multi-axis robotic vial loading system to insert pluralities of vials into the tray station as shown in FIGS. 13A-13C. Once the tray station is fully loaded, the tray is removable.

Figure 14:
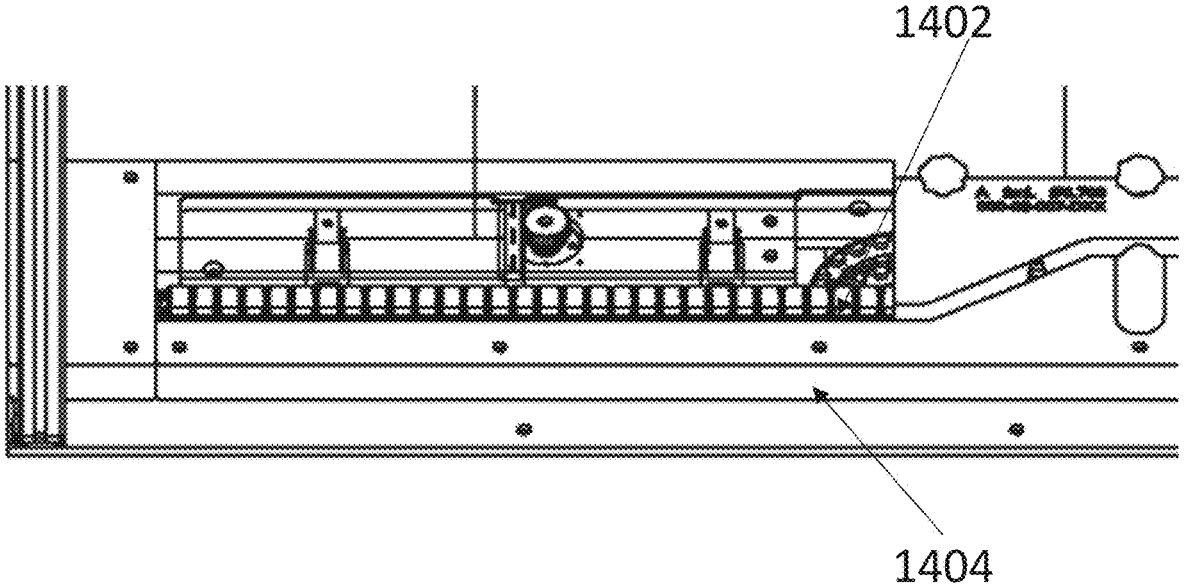
FIG. 14 illustrates a top view of a portion of a conveyor belt of a multi-axis robotic vial loading system according to one embodiment of the present invention.

FIG. 14 illustrates a top view of a portion of a conveyor belt near the multi-axis robots according to one embodiment of the present invention. The multi-axis robotic vial loading system includes an adjustable guide 1404 designed to position vials traveling along the conveyor belt 1402.

Figure 15:
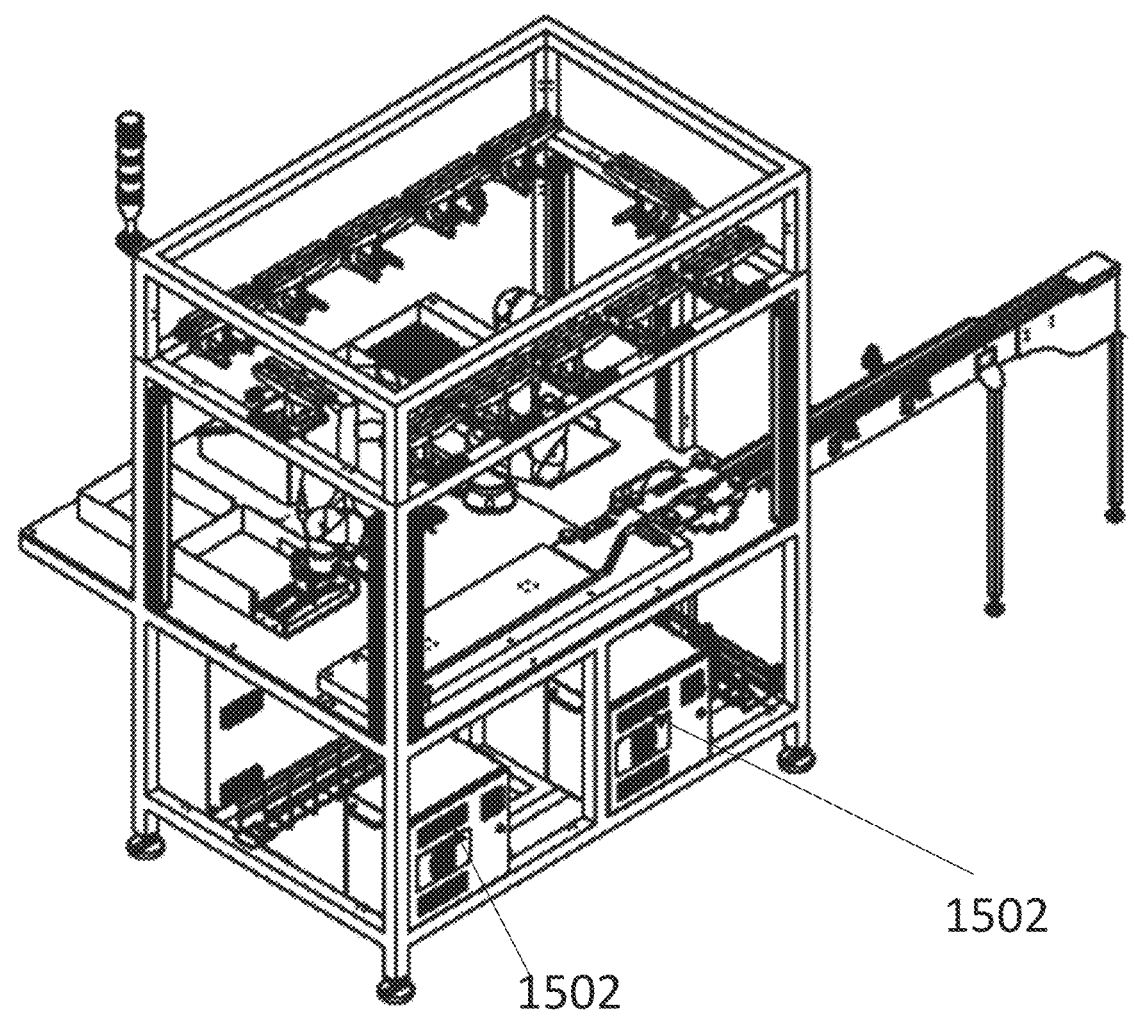
FIG. 15 illustrates a rear perspective view of an interior portion of a multi-axis robotic vial loading system according to one embodiment of the present invention.

FIG. 15 illustrates a rear perspective view of an interior portion of a multi-axis robotic vial loading system. In some embodiments, the multi-axis robotic vial loading system includes a plurality of multi-axis robot control motors 1502 located beneath the conveyor inside the base structure of the system.

Figure 16A:
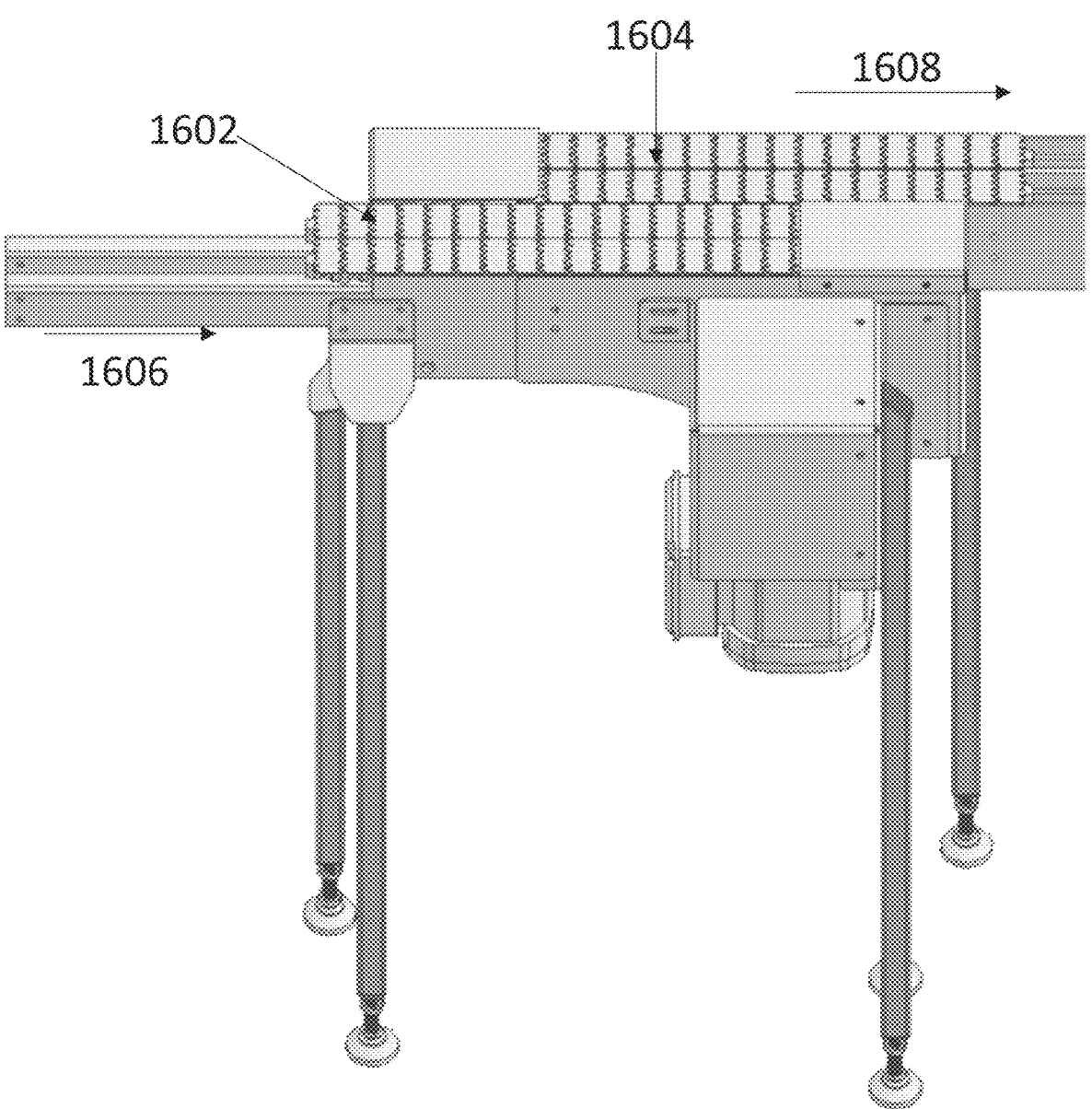
FIG. 16A illustrates a top perspective view of a plurality of belts feeding a multi-axis robotic vial loading system according to one embodiment of the present invention.
Figure 16B:
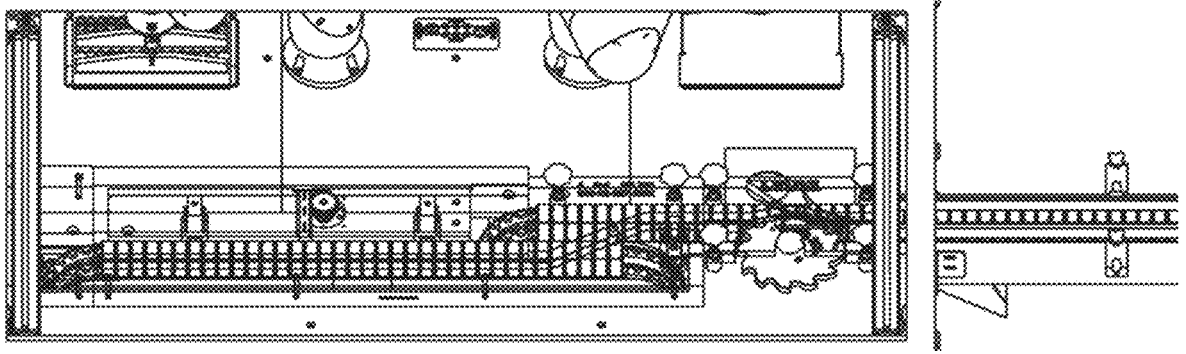
FIG. 16B illustrates a top perspective view of a plurality of belts feeding a multi-axis robotic vial loading system according to one embodiment of the present invention.

FIGS. 16A-16B illustrate a portion of a plurality of conveyor belts of a multi-axis robotic tray vial system according to one embodiment of the present invention. The multi-axis robotic vial loading system is designed to receive vials from an upstream source via another conveyor belt 1602 or similar transportation method. For example, and not limitation, in some embodiments, the multi-axis robotic vial loading system further includes a guide for positioning the vials received from the upstream source to the conveyor belt 1604. For further example, and not limitation, the upstream source includes a rotary accumulation table, an inline conveyor, an accumulation conveyor, and/or direct connection to other upstream processes and/or equipment. The conveyor belt 1604 is designed to move a plurality of containers (e.g., vials) downstream, as shown by arrow 1608, to an enclosure of the multi-axis robot vial loading system including at least one multi-axis robot and a tray station.

Figure 17A:
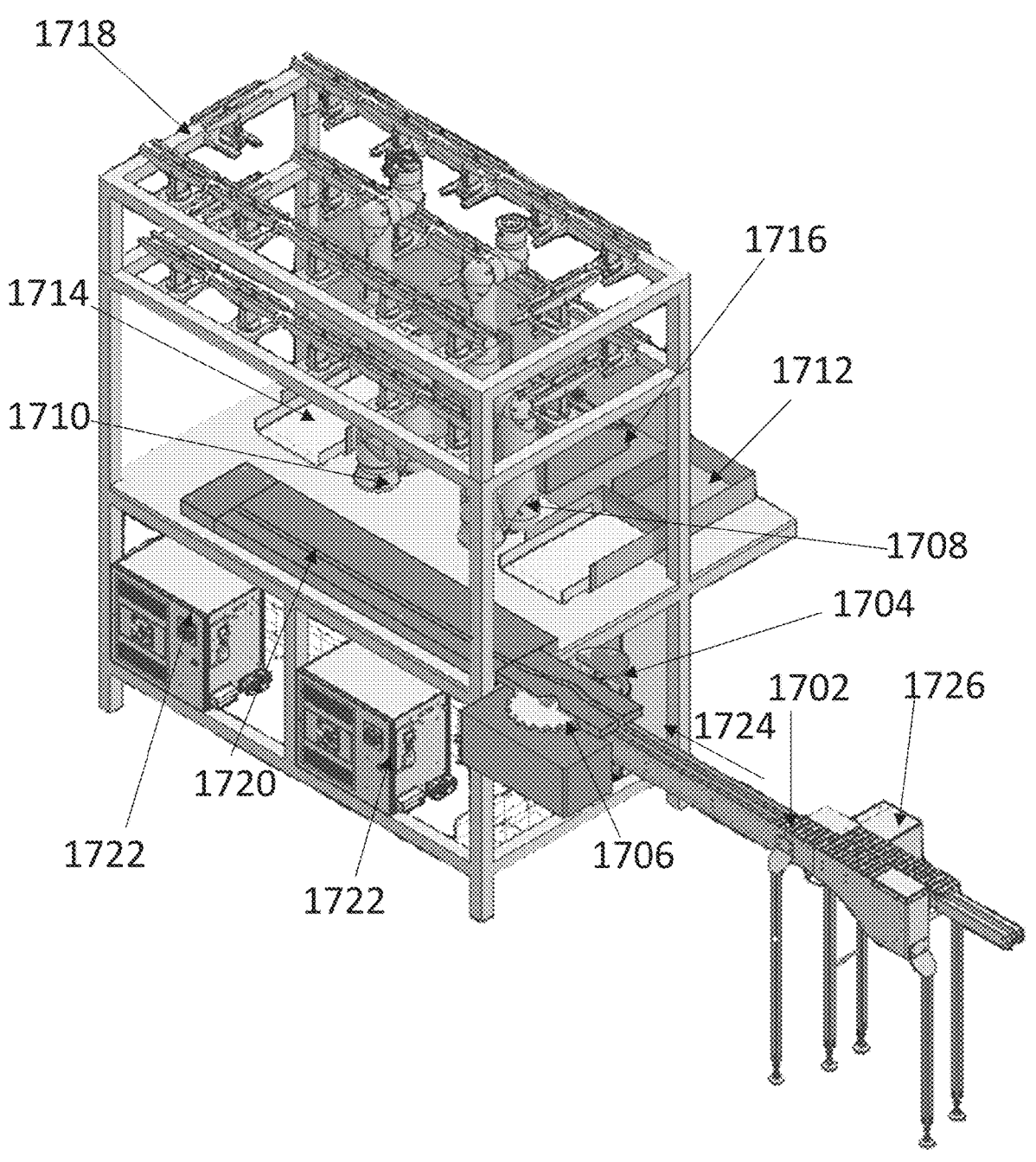
FIG. 17A illustrates a side perspective view of a multi-axis robotic vial loading system according to one embodiment of the present invention.
Figure 17B:
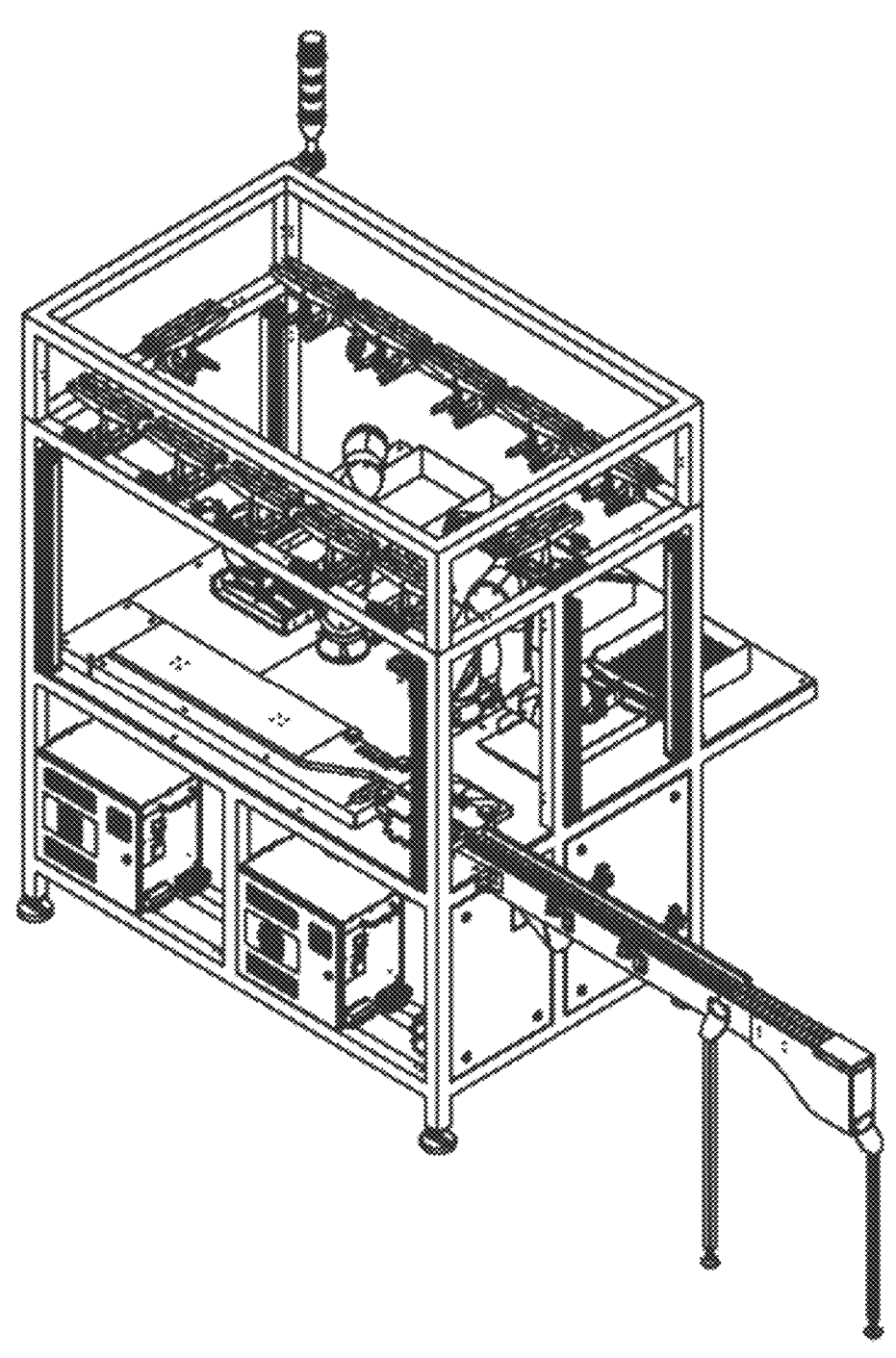
FIG. 17B illustrates a side perspective view of a multi-axis robotic vial loading system according to one embodiment of the present invention.

FIGS. 17A-B illustrate a side perspective view of a multi-axis robotic vial loading system according to one embodiment of the present invention. The multi-axis robotic vial loading system includes a conveyor belt 1702, a container trap 1704, a vial sorting device 1706, a first multi-axis robot 1708 with a first interchangeable gripper, a second multi-axis robot 1710 with a second interchangeable gripper, a first tray station 1712, a second tray station 1714, an operator control panel 1716, a plurality of rows of grippers of different sizes 1718, at least one vial guide 1720, and a plurality of multi-axis robot control motors 1722. The conveyor belt 1702 is designed to move a plurality of containers (e.g., vials) to the first multi-axis robot 1708 and the second multi-axis robot 1710 as shown by arrow 1724. For example, and not limitation, the conveyor belt includes at least two conveyor belts. Each conveyor belt is designed to transport a single file line of containers (e.g., vials) to the first multi-axis robot or the second multi-axis robot. In other embodiments, the conveyor belt includes at least one belt to transport a plurality of vials to the first multi-axis robot and the second multi-axis robot. The container trap 1704 is positioned on a side of the conveyor belt 1702 and is designed to capture containers that fall off the conveyor belt. The container trap ejects vials that have fallen on the conveyor belt into a chute to remove the vials from the conveyor belt. The vial guide 1720 is operable to adjust to a size of a plurality of vials. For example, and not limitation, in some embodiments, the vial guide 1720 is movable in a vertical direction. Alternatively, or additionally, the vial guide 1720 is operable to change size in a horizontal direction.

The multi-axis robotic vial loading system is designed to receive vials from an upstream source via another conveyor belt 1726 or similar transportation method. For example, and not limitation, in some embodiments, the multi-axis robotic vial loading system further includes a guide for positioning the vials received from the upstream source to the conveyor belt 1702. For further example, and not limitation, the upstream source includes a rotary accumulation table, an inline conveyor, an accumulation conveyor, and/or direct connection to other upstream processes and/or equipment. The conveyor belt 1702 is designed to move a plurality of containers (e.g., vials) downstream to an enclosure of the multi-axis robot vial loading system including at least one multi-axis robot and a tray station.

Figure 18A:
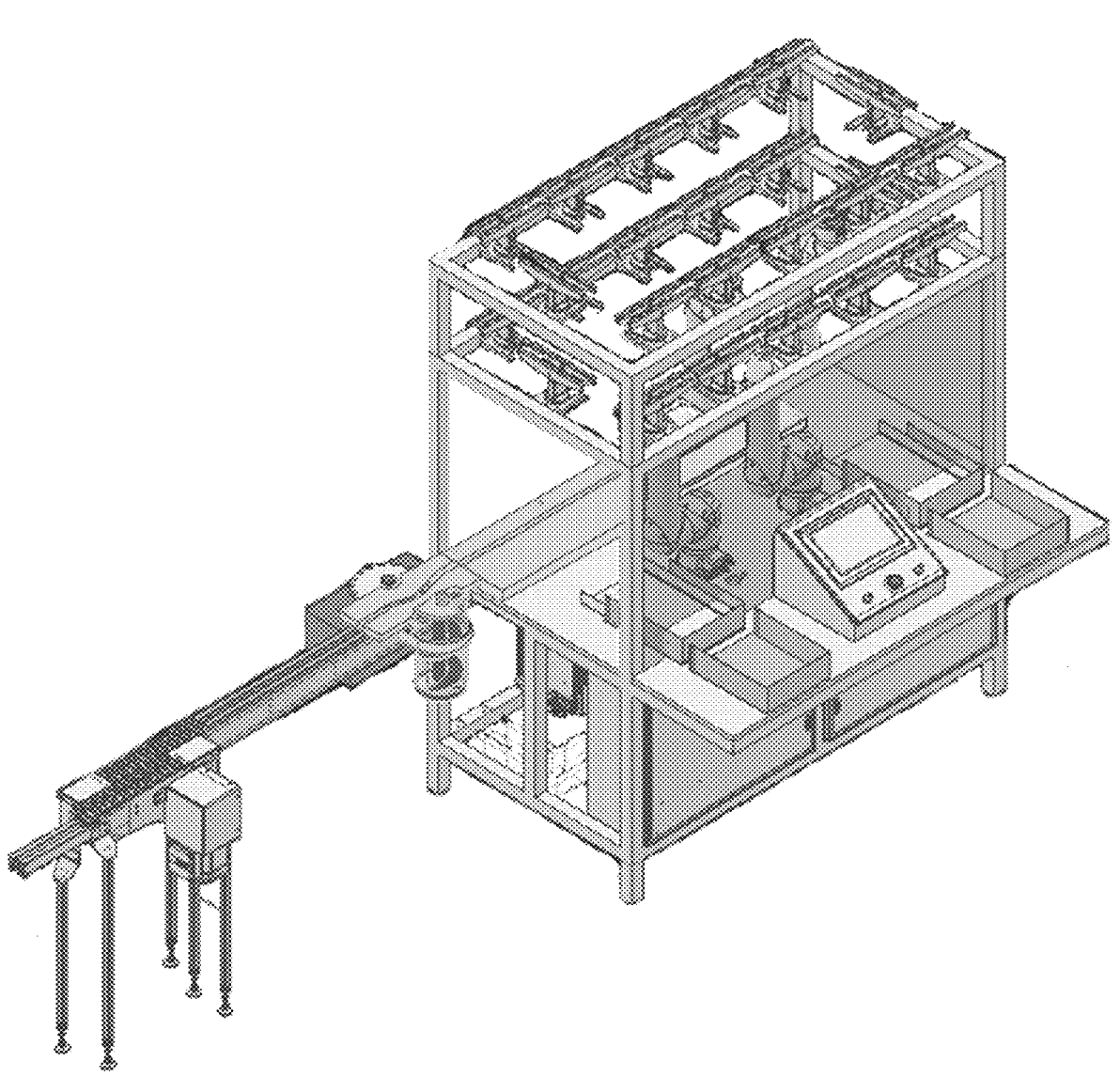
FIG. 18A illustrates a side perspective view of a multi-axis robotic vial loading system according to one embodiment of the present invention.
Figure 18B:
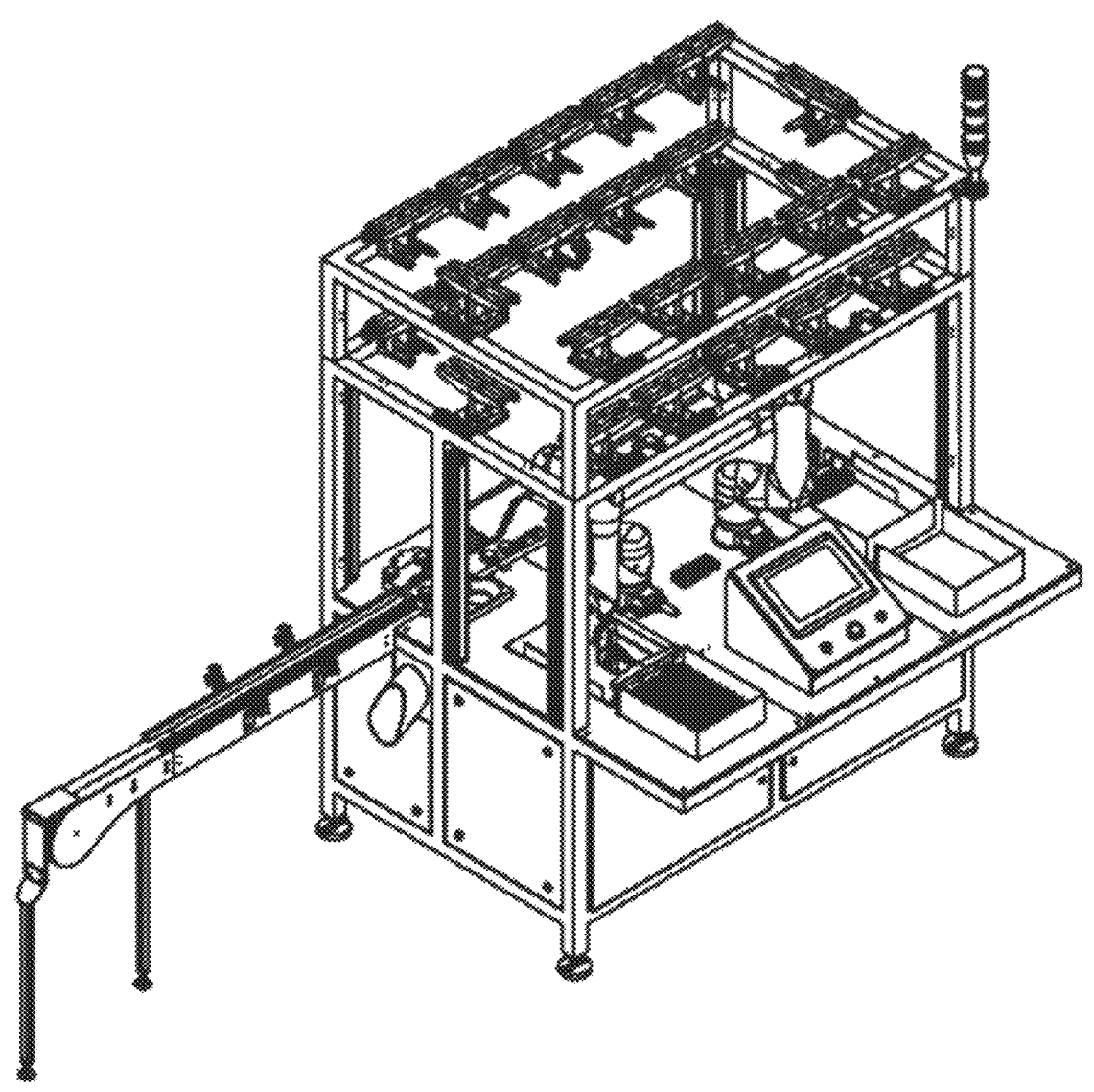
FIG. 18B illustrates a side perspective view of a multi-axis robotic vial loading system according to one embodiment of the present invention.
Figure 19:
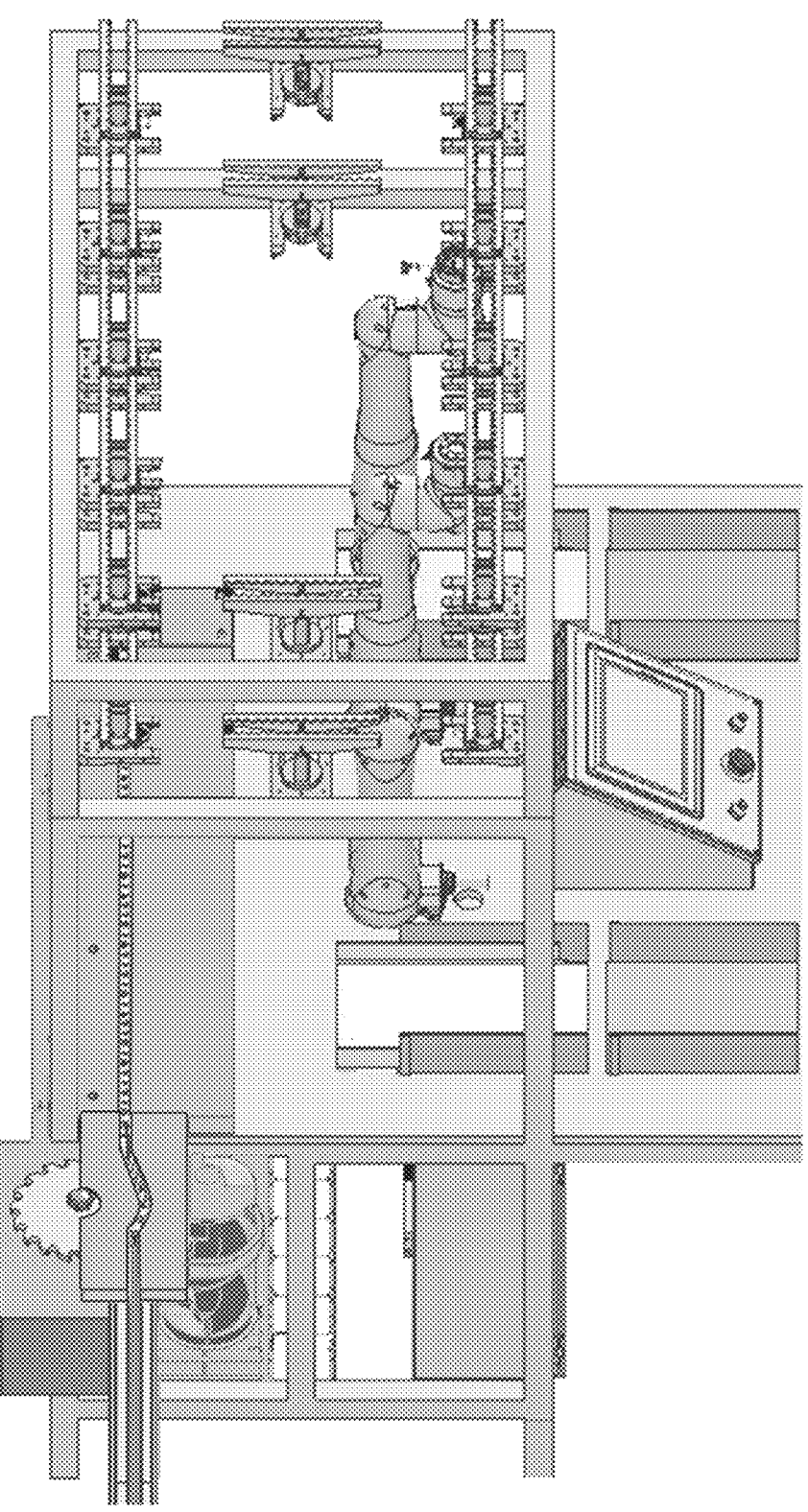
FIG. 19 illustrates a side perspective view of a multi-axis robotic vial loading system according to one embodiment of the present invention.
Figure 20A:
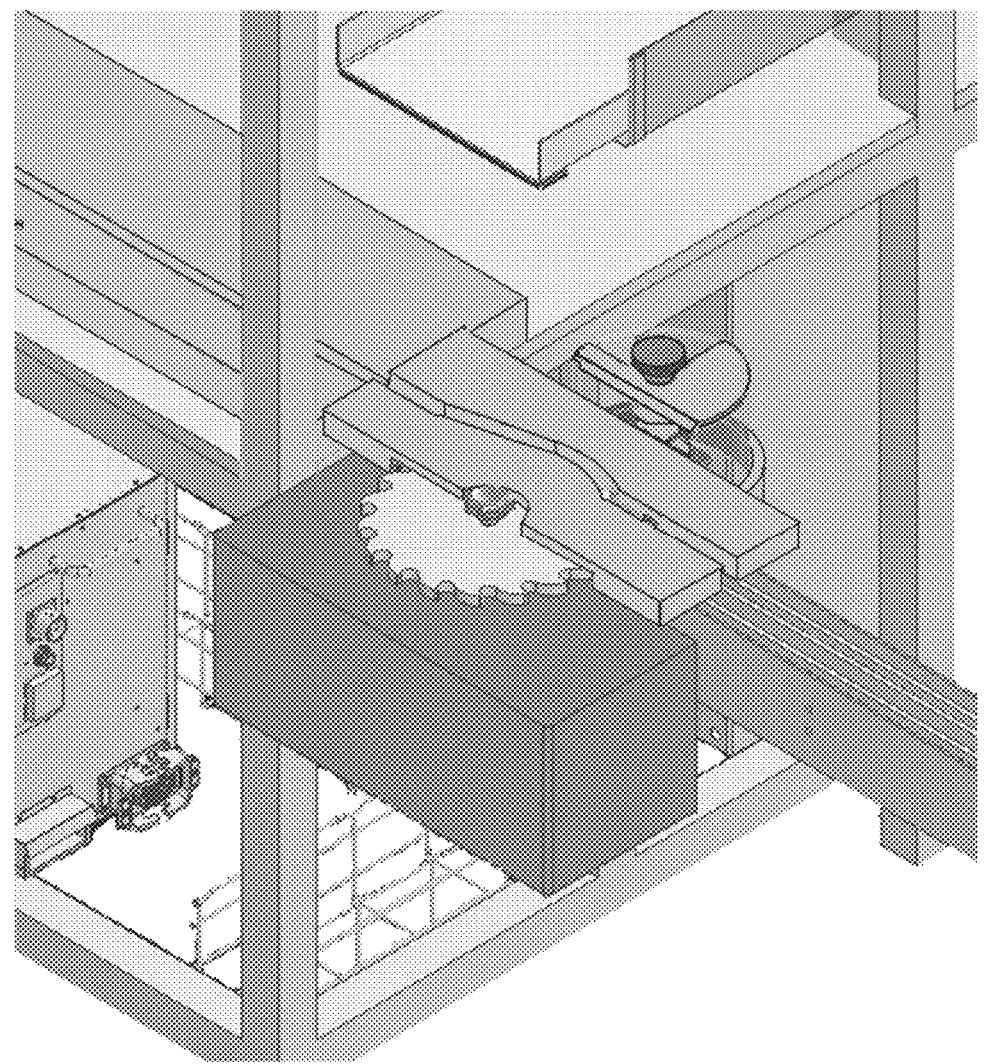
FIG. 20A illustrates a side perspective view of a fallen-vial sorter of a multi-axis robotic vial loading system according to one embodiment of the present invention.
Figure 20B:
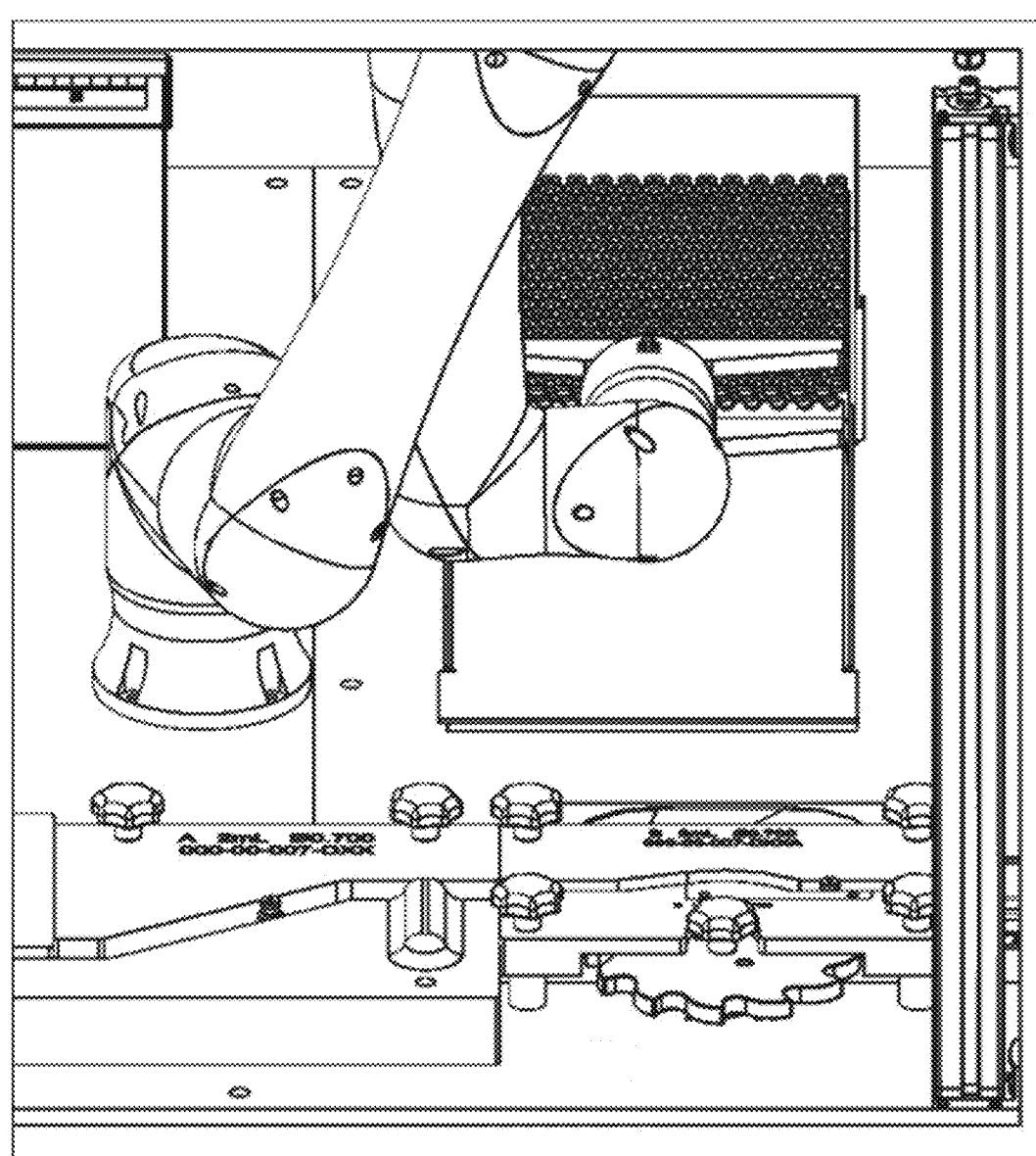
FIG. 20B illustrates a side perspective view of a fallen-vial sorter of a multi-axis robotic vial loading system according to one embodiment of the present invention.
Figure 21:
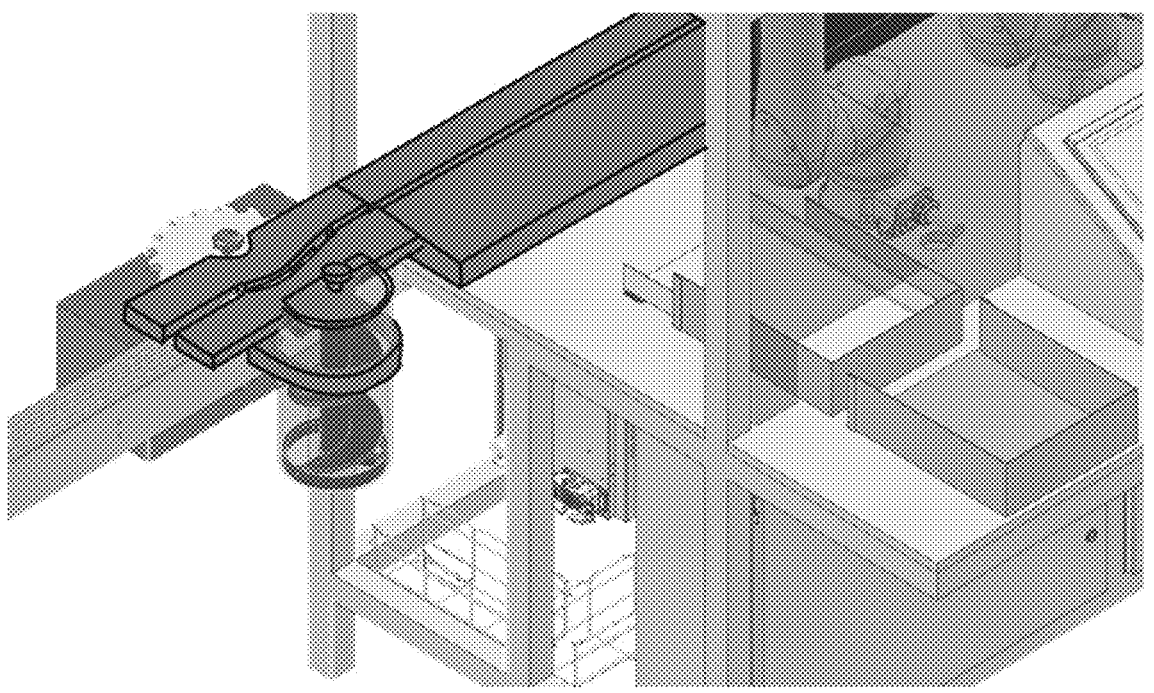
FIG. 21 illustrates a side perspective view of a vial sorter and fallen-vial trap of a multi-axis robotic vial loading system according to one embodiment of the present invention.
Figure 22:
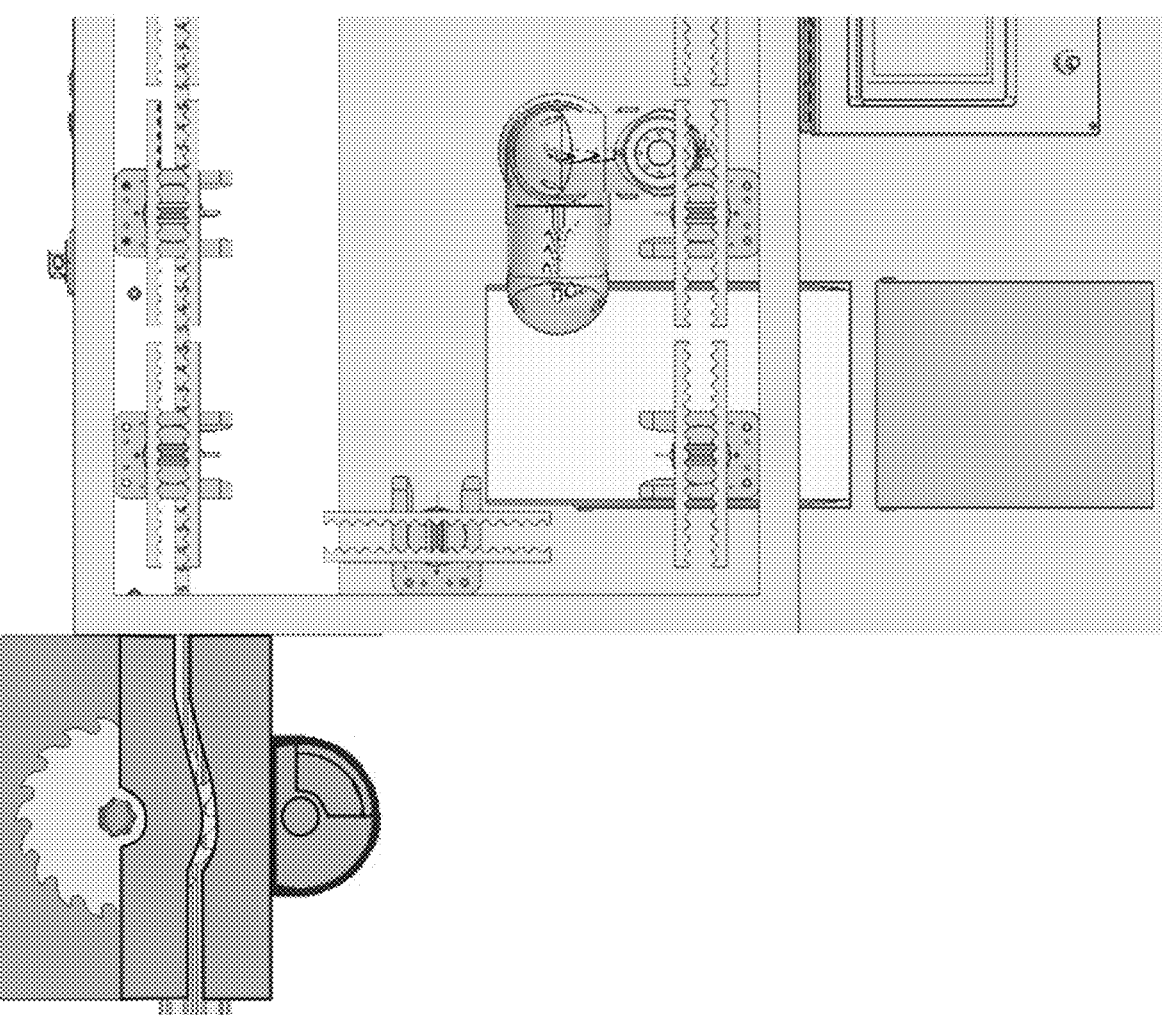
FIG. 22 illustrates a top view of a multi-axis robotic vial loading system according to one embodiment of the present invention.

FIGS. 18A-18B illustrate a side perspective of a multi-axis robotic vial loading system according to one embodiment of the present invention. FIG. 19 illustrates a side view of a multi-axis robotic vial loading system according to one embodiment of the present invention.

In some embodiments, as shown in FIGS. 20A-22, a vial sorting device includes a starwheel device that rotates as vials are received from the conveyor belt. The vial sorting device includes a plurality of pockets. Each pocket is spaced out to receive separate vials. Advantageously, this controls the flow of vials and improves vial tracking. The vial sorting device is operable to push fallen fails to the vial trap.

In some embodiments, the multi-axis robotic loading system includes an imaging system. The imaging system is designed to improve control and positioning of the multi-axis robots, verify the placement of vials before the multi-axis robots, verify the final placement of the vials and the vial count within a tray, and to track vials using identification markers (e.g., barcode, marks). The multi-axis robotic vial loading system may further include tray verification. In some embodiments, at least one imaging device (e.g., a camera) is attached to at least one of the multi-axis robots. Advantageously, the imaging device is operable to capture image data corresponding to a vial and the multi-axis robotic vial loading system is operable to monitor and generate alerts based on the vial imaging data. For example, and not limitation, if a vial is missing a label or a stopper, has incorrect orientation, or another problem, the imaging system is operable to generate an alarm and display the alert via a human machine interface.

Figure 23:
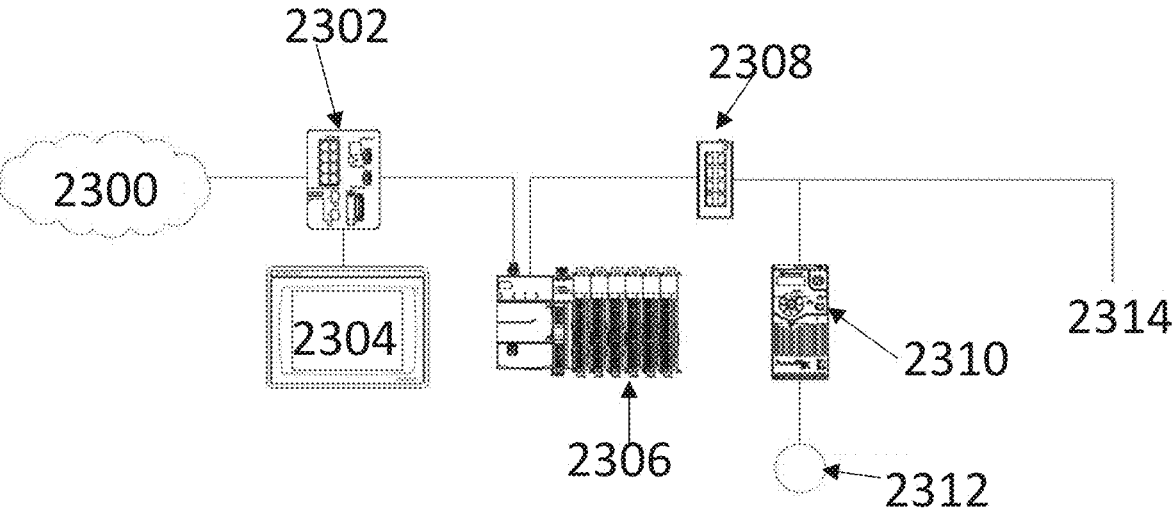
FIG. 23 illustrates a schematic diagram of a multi-axis robotic vial loading system according to one embodiment of the present invention.

FIG. 23 illustrates a schematic diagram of a multi-axis robotic vial loading system according to one embodiment of the present invention. In some embodiments, the multi-axis robotic vial loading system includes a network 2300, a network switch 2302, a human machine interface 2304, a logic controller 2306, a local network switch 2308, a plurality of motor and servo drives 2310 connected to a plurality of motors 2312, and a plurality of field devices 2314. Advantageously, in some embodiments, remote devices (e.g., mobile devices, cellphones) are in network communication with the multi-axis robotic vial loading system. In some embodiments, the multi-axis robotic vial loading system includes a local server and/or is hosted on a network resource (e.g., cloud). The logic controller controls the overall operation of the multi-axis robotic vial loading system. The logic controller includes any controller microcontroller, or microprocessor capable of processing program instructions. The logic controller is designed to operate movement paths (e.g., subroutine) for the multi-axis robots and to determine which routines fail and at what point of the process that failure is experienced. The logic controller is further operable to control internal motors for each multi-axis robot.

By way of example, and not limitation, the controller may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a state machine, gated or transistor logic, discrete hardware components, or any other suitable entity or combinations thereof that can perform calculations, process instructions for execution, and/or other manipulations of information.

In another embodiment, multiple processors and/or multiple buses may be used, as appropriate, along with multiple memories of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multiprocessor system). Alternatively, some steps or methods may be performed by circuitry that is specific to a given function. According to various embodiments, the computer system may operate in a networked environment using logical connections to local and/or remote computing devices through a network. A computing device may connect to a network through a network interface unit connected to a bus. Computing devices may communicate communication media through wired networks, direct-wired connections or wirelessly, such as acoustic, RF, or infrared, through an antenna in communication with the network antenna and the network interface unit, which may include digital signal processing circuitry when necessary. The network interface unit may provide for communications under various modes or protocols.

Aspects of the present invention may be implemented as a system, method or computer program product. They may be implemented as an entirely hardware embodiment, an entirely software embodiment (including firmware, resident software, micro-code, etc.) or an embodiment combining software and hardware aspects that may all generally be referred to herein as a "circuit," "module" or "system." Aspects of the present invention may be implemented as a computer program product embodied in one or more computer-readable medium(s) storing computer-readable program code. The terms "machine-readable medium" and "machine-readable storage medium" may include a single medium or multiple media (e.g., a centralized or distributed database, and/or associated caches and servers) that store one or more sets of instructions. These terms may include any medium that is capable of storing, encoding or carrying a set of instructions for execution by the machine and that cause the machine to perform any one or more of the methodologies of the presently disclosed technique and innovation.

Figure 24:
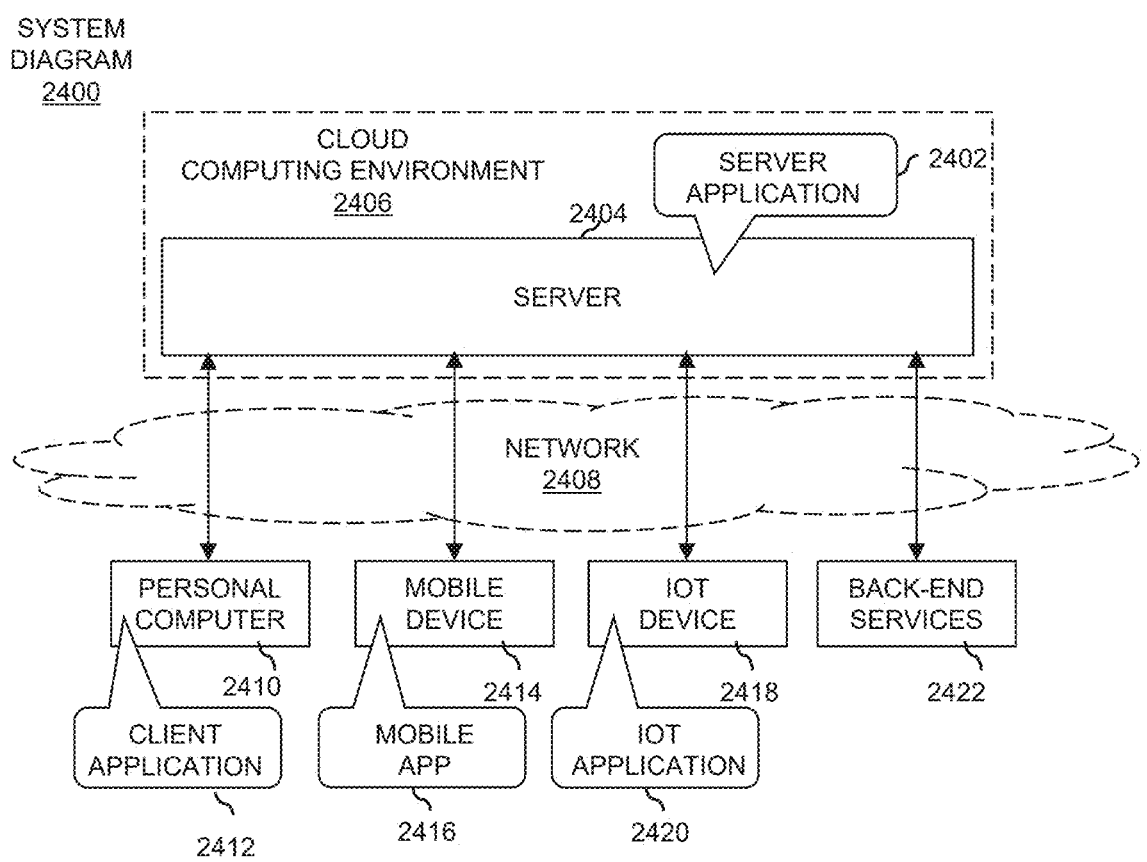
FIG. 24 illustrates a schematic diagram of a multi-axis robotic vial loading system according to one embodiment of the present invention.

FIG. 24 depicts a system diagram 2400 illustrating a client/server architecture in accordance with embodiments of the present disclosure. The server application 2402 is configured to provide a video application and mobile application for a multi-axis robotic vial loading system. A server application 2402 is hosted on a remote server 2404 within a cloud computing environment 2406. The server application 2402 is provided on a non-transitory computer-readable medium including a plurality of machine-readable instructions, which when executed by one or more processors of the server 2404, are adapted to cause the server 2404 to generate the video platform and mobile application.

The server application 2402 is configured to communicate over a network 2408. In a preferred embodiment, the network 2408 is the Internet. In other embodiments, the network 2408 may be restricted to a private local area network (LAN) and/or private wide area network (WAN). The network 2408 provides connectivity with a plurality of client devices including a personal computer 2410 hosting a client application 2412, a mobile device 2414 hosting a mobile app 2416. The network 2408 also provides connectivity for an Internet-Of-Things (IoT) device 2418 hosting an IoT application 2420, and to back-end services 2422. Advantageously, the back-end services are operable to communicate with third-party application programming interfaces (APIs) to either provide or receive data that can be used by the system to provide recommendations. Third-party applications provide algorithms for analysis of data. The back-end services may provide data gathered within the multi-axis robotic vial loading system through the third-party APIs and receives results from the algorithms provided back to the back-end services to provide further recommendations or take further actions within the multi-axis robotic vial loading system.

Figure 25:
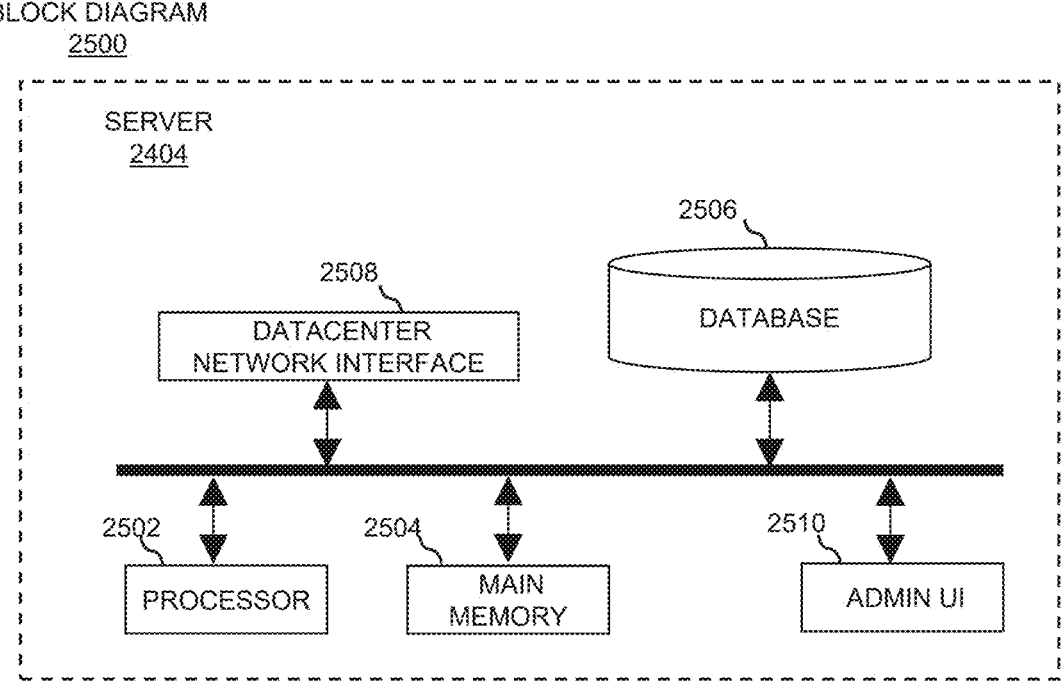
FIG. 25 illustrates a schematic diagram of a remote server of a multi-axis robotic vial loading system according to one embodiment of the present invention.

FIG. 25 depicts a block diagram 2500 of the server 2404 of FIG. 24 for hosting at least a portion of the server application 2402 of FIG. 24 in accordance with embodiments of the present disclosure. The server 2404 may be any of the hardware servers referenced in this disclosure. The server 2404 may include at least one of a processor 2502, a main memory 2504, a database 2506, a datacenter network interface 2508, and an administration user interface (UI) 2510. The server 2404 may be configured to host one or more virtualized servers. For example, the virtual server may be an Ubuntu® server or the like. The server 2404 may also be configured to host a virtual container. For example, the virtual server may be the DOCKER® virtual server or the like. In some embodiments, the virtual server and or virtual container may be distributed over a plurality of hardware servers using hypervisor technology.

The processor 2502 may be a multi-core server class processor suitable for hardware virtualization. The processor 2502 may support at least a 64-bit architecture and a single instruction multiple data (SIMD) instruction set. The memory 2504 may include a combination of volatile memory (e.g., random access memory) and non-volatile memory (e.g., flash memory). The database 2506 may include one or more hard drives.

The datacenter network interface 2508 may provide one or more high-speed communication ports to the data center switches, routers, and/or network storage appliances. The datacenter network interface may include high-speed optical Ethernet, InfiniBand (IB), Internet Small Computer System Interface iSCSI, and/or Fibre Channel interfaces. The administration UI may support local and/or remote configuration of the server by a data center administrator.

Figure 26:
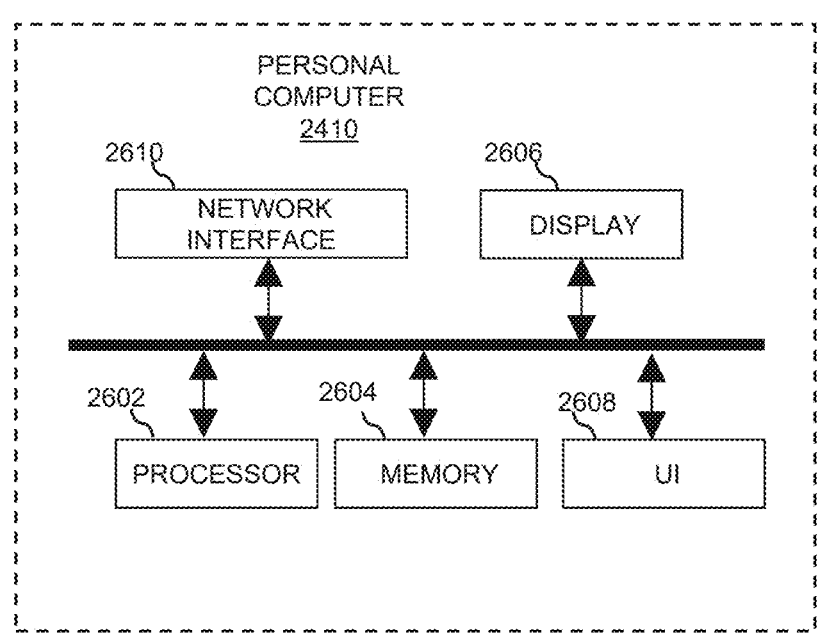
FIG. 26 illustrates a schematic diagram of a personal computer of a multi-axis robotic vial loading system according to one embodiment of the present invention.

FIG. 26 depicts a block diagram 2600 of the personal computer 2410 of FIG. 24 in accordance with embodiments of the present disclosure. The personal computer 2410 may be any of the devices referenced in this disclosure. The personal computer 2410 may include at least a processor 2602, a memory 2604, a display 2606, a user interface (UI) 2608, and a network interface 2610. The personal computer 2410 may include an operating system to run a web browser and/or the client application 2412 shown in FIG. 24. The operating system (OS) may be a Windows® OS, a Macintosh® OS, or a Linux® OS. The memory 2604 may include a combination of volatile memory (e.g., random access memory) and non-volatile memory (e.g., solid state drive and/or hard drives).

The network interface 2610 may be a wired Ethernet interface or a Wi-Fi interface. The personal computer 2410 may be configured to access remote memory (e.g., network storage and/or cloud storage) via the network interface 2610. The UI 2608 may include a keyboard, and a pointing device (e.g., mouse). The display 2606 may be an external display (e.g., computer monitor) or internal display (e.g., laptop). In some embodiments, the personal computer 2410 may be a smart TV. In other embodiments, the display 2606 may include a holographic projector.

Figure 27:
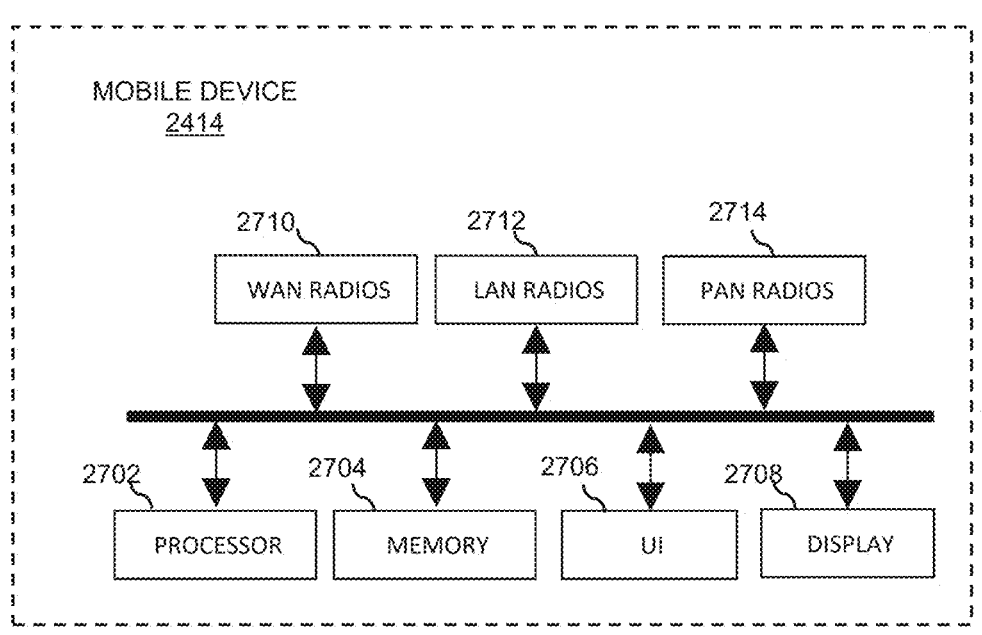
FIG. 27 illustrates a schematic diagram of a mobile device of a multi-axis robotic vial loading system according to one embodiment of the present invention.

FIG. 27 depicts a block diagram 2700 of the mobile device 2414 of FIG. 24 in accordance with embodiments of the present disclosure. The mobile device 2414 may be any of the remote devices referenced in this disclosure. The mobile device 2414 may include an operating system to run a web browser and/or the mobile app 2416 shown in FIG. 24. The mobile device 2414 may include at least a processor 2702, a memory 2704, a UI 2706, a display 2708, WAN radios 2710, LAN radios 2712, and personal area network (PAN) radios 2714. In some embodiments the mobile device 2414 may be an iPhone® or an iPad®, using iOS® as an OS. In other embodiments the mobile device 2414 may be a mobile terminal including Android® OS, BlackBerry® OS, Chrome® OS, Windows Phone® OS, or the like.

In some embodiments, the processor 2702 may be a mobile processor such as the Qualcomm® Snapdragon™ mobile processor. The memory 2704 may include a combination of volatile memory (e.g., random access memory) and non-volatile memory (e.g., flash memory). The memory 2704 may be partially integrated with the processor 2702. The UI 2706 and display 2708 may be integrated such as a touchpad display. The WAN radios 2710 may include 2G, 3G, 4G, and/or 5G technologies. The LAN radios 2712 may include Wi-Fi technologies such as 802.11a, 802.11b/g/n, and/or 802.11ac circuitry. The PAN radios 2714 may include Bluetooth® technologies.

Figure 28:
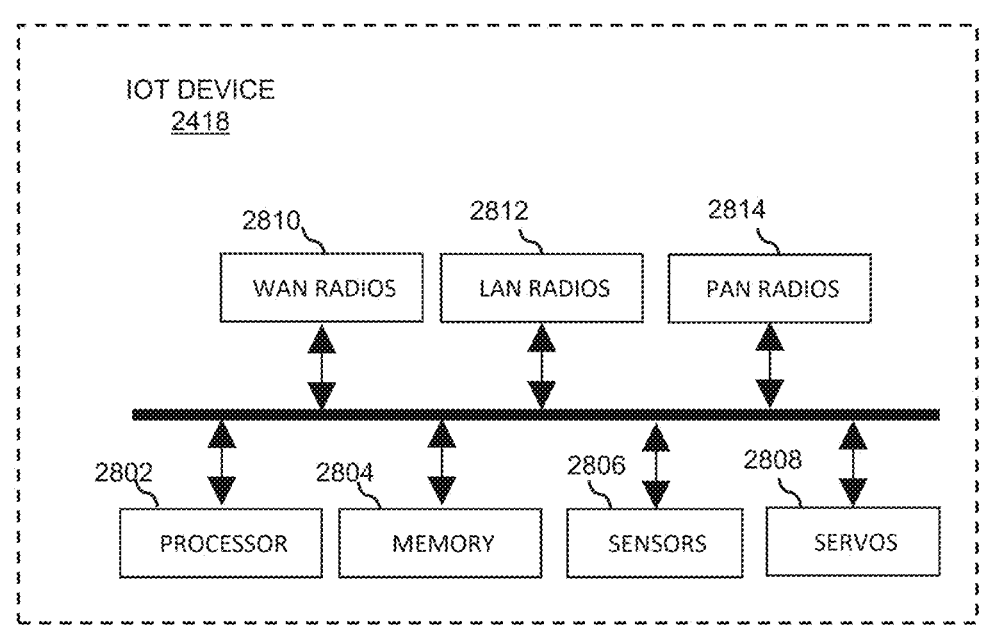
FIG. 28 illustrates a schematic diagram of an internet-of-things (IoT) device of a multi-axis robotic vial loading system according to one embodiment of the present invention.

FIG. 28 depicts a block diagram 2800 of the IoT device 2418 of FIG. 24 in accordance with embodiments of the present disclosure. The IoT device 2418 may be any of the remote devices referenced in this disclosure. The IoT device 2418 includes a processor 2802, a memory 2804, sensors 2806, servos 2808, WAN radios 2810, LAN radios 2812, and PAN radios 2814. The processor 2802, a memory 2804, WAN radios 2810, LAN radios 2812, and PAN radios 2814 may be of similar design to the processor 2702, a memory 2704, WAN radios 2710, LAN radios 2712, and PAN radios 2714 of the mobile device 2414 of FIG. 27. The sensors 2806 and servos 2808 may include any applicable components related to IoT devices such as a monitoring device, a smart appliance, a virtual reality device, an augmented reality device, or the like.

Any combination of one or more computer-readable medium(s) may be utilized. The computer-readable medium may be a computer-readable signal medium or a computer-readable storage medium (such as non-transitory computer-readable storage media). A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer-readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby®, JavaScript®, Java®, Python®, PHP, C, C++, C#, Objective-C®, Go®, Scala®, Swift®, Kotlin®, OCaml®, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A multi-axis robotic loading system comprising:
at least one conveyor belt;
at least one multi-axis robotic arm; and
at least one gripper;
    wherein the at least one conveyor belt is operable to transport at least one container to the at least one multi-axis robotic arm;
    wherein the at least one gripper is removably attached to the at least one multi-axis robotic arm;
    wherein the at least one multi-axis robotic arm is operable to automatically change the at least one gripper; and
    wherein, via the at least one gripper, the at least one multi-axis robotic arm is operable to grab the at least one container; and
        wherein, once the at least one gripper captures the at least one container, the at least one multi-axis robotic arm is operable to transport the at least one container to a storage device.

2. The multi-axis robotic loading system of claim 1, wherein the at least one multi-axis robotic arm has at least three degrees of freedom.

3. The multi-axis robotic loading system of claim 1, wherein the storage device includes a tray, wherein the at least one container includes a vial.

4. The multi-axis robotic loading system of claim 1, wherein the at least one gripper includes a vacuum gripper, wherein the vacuum gripper includes an attachment module, a vacuum generation component, and a gripping component, wherein the attachment module is removably attached to the multi-axis robotic arm.

5. The multi-axis robotic loading system of claim 1, wherein the at least one conveyor belt includes at least one container sorting component, wherein the at least one container sorting component is operable to rotate a plurality of containers moving along the at least one conveyor belt, wherein the at least one container sorting component is operable to maintain spacing of the plurality of containers.

6. The multi-axis robotic loading system of claim 1, wherein the at least one multi-axis robotic arm changes the at least one gripper based on a container characteristic, wherein the container characteristic includes at least one of container size or container shape.

7. The multi-axis robotic loading system of claim 6, wherein the at least one gripper is operable to move in a horizontal direction and a vertical direction.

8. The multi-axis robotic loading system of claim 7 further comprising a plurality of grippers positioned above the at least one multi-axis robotic arm, wherein the at least one multi-axis robotic arm is operable to extend toward the plurality of grippers, wherein the at least one multi-axis robotic arm is further operable to attach to at least one gripper of the plurality of grippers.

9. A multi-axis robotic loading system comprising:
at least one conveyor belt;
a plurality of multi-axis robotic arms; and
a plurality of grippers;
    wherein the at least one conveyor belt is operable to transport a plurality of containers to the plurality of multi-axis robotic arms;
    wherein the plurality of grippers is removably attached to the plurality of multi-axis robotic arms;
    wherein, via the plurality of grippers, the plurality of multi-axis robotic arms is operable to capture the plurality of containers; and
    wherein, once the plurality of containers is captured, the plurality of multi-axis robotic arms is operable to transport the plurality of containers to at least one storage device.

10. The multi-axis robotic loading system of claim 9, wherein the at least one conveyor belt includes at least two conveyor belts, wherein the plurality of multi-axis robotic arms comprise a first multi-axis robotic arm and a second multi-axis robotic arm, wherein the at least two conveyor belts includes a first conveyor belt and a second conveyor belt, wherein the first conveyor belt transports a first plurality of containers to the first multi-axis robotic arm, wherein the second conveyor belt transports a second plurality of containers to the second multi-axis robotic arm.

11. The multi-axis robotic loading system of claim 10, wherein the first conveyor belt moves at a different speed than the second conveyor belt.

12. The multi-axis robotic loading system of claim 9, wherein each multi-axis robotic arm of the plurality of multi-axis robotic arms includes at least three degrees of freedom.

13. The multi-axis robotic loading system of claim 9, wherein each multi-axis robotic arm of the plurality of multi-axis robotic arms includes at least five degrees of freedom.

14. The multi-axis robotic loading system of claim 9, wherein the plurality of grippers includes at least one vacuum gripper, wherein the at least one vacuum gripper includes an attachment module, a vacuum generation component, and a gripping component.

15. The multi-axis robotic loading system of claim 9, wherein the plurality of grippers includes a pneumatic gripper, wherein the pneumatic gripper includes an attachment module, a vacuum generation component, and a gripping component.

16. The multi-axis robotic loading system of claim 9, wherein each multi-axis robotic arm of the plurality of multi-axis robotic arms is operable to automatically change at least one gripper.

17. The multi-axis robotic loading system of claim 16, wherein each multi-axis robotic arm of the plurality of multi-axis robotic arms is operable to change the at least one gripper based on a container characteristic, wherein the container characteristic includes at least one of container size or container shape.

18. The multi-axis robotic loading system of claim 17, wherein the at least one gripper is operable to move in a horizontal direction and a vertical direction.

19. The multi-axis robotic loading system of claim 17 further comprising a plurality of grippers positioned above the plurality of multi-axis robotic arms, wherein each multi-axis robotic arm of the plurality of multi-axis robotic arms is operable to extend toward the plurality of grippers, wherein each multi-axis robotic arm of the plurality of multi-axis robotic arms is further operable to attach to at least one gripper of the plurality of grippers.

20. The multi-axis robotic loading system of claim 19, wherein each multi-axis robotic arm of the plurality of multi-axis robotic arms is operable to place a connected gripper in the plurality of grippers, wherein, after placing the connected gripper in the plurality of grippers, the multi-axis robotic arm is operable to attach to a second gripper.

\*　\*　\*　\*　\*